US012715317B2

(12) United States Patent
Elezab et al.

(10) Patent No.: US 12,715,317 B2
(45) Date of Patent: Aug. 25, 2026

(54) LLC RESONANT CONVERTER AND APPLICATIONS OF SAME

(71) Applicant: McMaster University, Hamilton (CA)

(72) Inventors: Ahmed Elezab, Hamilton (CA); Omar Zayed, Hamilton (CA); Mehdi Narimani, Oakville (CA)

(73) Assignee: MCMASTER UNIVERSITY, Hamilton (CA)

( * ) Notice: Subject to any disclaimer, the term of this patent is extended or adjusted under 35 U.S.C. 154(b) by 700 days.

(21) Appl. No.: 18/110,972

(22) Filed: Feb. 17, 2023

(65) Prior Publication Data

US 2024/0278659 A1 Aug. 22, 2024

(51) Int. Cl.

*H02M 3/335* (2006.01)
*B60L 53/12* (2019.01)
*B60L 53/62* (2019.01)
*H02J 7/90* (2026.01)
*H02J 50/12* (2016.01)
*H02J 50/40* (2016.01)
*H02M 3/00* (2006.01)

(52) U.S. Cl.

CPC ............... *B60L 53/12* (2019.02); *B60L 53/62* (2019.02); *H02J 7/933* (2026.01); *H02J 50/12* (2016.02); *H02J 50/40* (2016.02); *H02M 3/01* (2021.05); *H02M 3/33573* (2021.05); *B60L 2210/30* (2013.01); *B60L 2210/40* (2013.01)

(58) Field of Classification Search

CPC ............. H02M 3/33573; H02M 3/335; H02M 3/33546; H02M 3/335553; H02M 3/33561; H02M 3/33569; H02M 3/33571; H02M 3/33576; H02M 3/33592; H02M 3/01; H02M 3/015

See application file for complete search history.

(56) References Cited

U.S. PATENT DOCUMENTS

| | | | | |
|---|---|---|---|---|
| 11,451,139 | B2 * | 9/2022 | Forouzesh | H02M 7/06 |
| 11,498,448 | B2 | 11/2022 | Van De Water | |
| 11,575,326 | B2 | 2/2023 | Jimenez Pino et al. | |
| 2023/0131143 | A1 * | 4/2023 | Morrison | H02M 3/33573 363/68 |
| 2023/0378795 | A1 * | 11/2023 | Ammanamanchi | H02M 1/0077 |

* cited by examiner

*Primary Examiner* — Nguyen Tran

(57) ABSTRACT

An LLC resonant converter is provided. The LLC resonant converter includes a primary sub-circuit coupled to a direct-current (DC) input voltage and a first secondary sub-circuit and a second secondary sub-circuit. The primary sub-circuit includes a resonant tank, that includes a combination of a resonant inductor, a resonant capacitor and a magnetizing inductor. The LLC resonant converter also includes a first transformer isolating the primary sub-circuit from the first secondary sub-circuit and a second transformer isolating the primary sub-circuit from the second secondary sub-circuit. The first and the second secondary sub-circuits are configurable in a series mode and a parallel mode by switching configurations of a plurality of transition switches, and the first and the second secondary sub-circuits provide an output charging voltage and an output charging current for charging an external device. A charging station comprising one or more charging poles, with each charging pole comprising one of more LLC resonant converter modules is also disclosed.

18 Claims, 22 Drawing Sheets

LLC RESONANT CONVERTER AND APPLICATIONS OF SAME

FIELD

The described embodiments generally relate to an improved LLC resonant converter and applications of the same.

BACKGROUND

The transportation sector is a significant contributor to global greenhouse gas emission. Internal combustion engines of motor vehicles burn fossil fuels like gasoline and diesel to drive the vehicles and generate greenhouse gas emissions in the process. The greenhouse gas emission of the transportation sector can be reduced by using electric vehicles instead of internal combustion engine-based motor vehicles.

However, despite the push to electrification to mitigate the energy sustainability problems and the environment crisis, some of the main challenges standing in the way of widespread adoption of electric vehicles include long charging times and limited range per charge.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

According to some aspects, a wide output voltage range charging module for ultra-fast DC-connected charging stations is provided. The charging module comprises an LLC resonant converter in accordance with the embodiment described herein. The LLC resonant converter includes two branches of a primary sub-circuit and two secondary sub-circuits coupled to each other via two transformers.

According to the various embodiments illustrated herein, the LLC resonant converter can transition between a series mode and a parallel mode. The LLC resonant converter can be used in the series mode for voltage sharing in high output voltage operations, and in the parallel mode for current sharing in high current operations.

In the various embodiments disclosed herein, the wide output voltage range of the LLC resonant converter can extend from 200V to 1000V. In addition, the LLC resonant converters can be stacked to increase the charging power to ultra-fast power levels.

According to some aspects, a charging station is provided. The charging station comprises one or more charging poles, and each charging pole comprises one or more LLC resonant converter modules in accordance with the embodiment described herein. The one or more LLC resonant converter modules of each charging pole can be connected in parallel to accommodate a wide range of voltage and power needs of electric vehicles, such as, for example, electric busses, trucks, cars, and those used in marine and aerospace applications.

In an aspect of the disclosure, there is provided an LLC resonant converter, comprising: a primary sub-circuit coupled to a direct-current (DC) input voltage; a first secondary sub-circuit and a second secondary sub-circuit; the primary sub-circuit comprising a resonant tank, the resonant tank comprising a combination of a resonant inductor, a resonant capacitor and a magnetizing inductor; a first transformer isolating the primary sub-circuit from the first secondary sub-circuit and comprising a corresponding predetermined number of turns; a second transformer isolating the primary sub-circuit from the second secondary sub-circuit and comprising a corresponding predetermined number of turns; the first and the second secondary sub-circuits being configurable in a series mode and a parallel mode by switching configurations of a plurality of transition switches; and the first and the second secondary sub-circuits providing an output charging voltage and an output charging current for charging an external device.

In various embodiments, the primary sub-circuit includes: a plurality of switches configured in a full-bridge topology; and the resonant inductor connected in series with a parallel combination of a first resonant branch and a second resonant branch, the first resonant branch coupled to the first transformer, and the second resonant branch coupled to the second transformer; the first resonant branch comprising a first resonant capacitor coupled to a first magnetizing inductor, and the second resonant branch comprising a second resonant capacitor coupled to a second magnetizing inductor, wherein each of the first resonant capacitor and the second resonant capacitor provides half the target resonant capacitance, and each of the first magnetizing inductor and the second magnetizing inductor provides twice the target magnetizing inductance.

The primary sub-circuit can also include a capacitor bank in parallel to the combination of the plurality of switches.

In various embodiments, the first and second secondary sub-circuits include a diode rectifier. The diode rectifier can be a full-bridge rectifier.

Each of the first and second secondary sub-circuits can also include a capacitor bank in parallel to the corresponding diode rectifier.

In various embodiments, the plurality of transition switches comprise a first transition switch, a second transition switch and a third transition switch.

In various embodiments, in the series mode, the first transition switch is closed, and the second and the third transition switches are open, and wherein the first and the second secondary sub-circuits are connected in series and generate a higher output charging voltage than the parallel mode configuration.

In various embodiments, in the parallel mode, the first transition switch is open, and the second and the third transition switches are closed, and wherein the first and the second secondary sub-circuits are connected in parallel and generate a lower output charging voltage than the series mode configuration.

The plurality of transition switches can be contactors.

The output charging voltage of the LLC resonant converter can range from about 200V to about 1000V.

In another aspect of the disclosure, a charging station is provided. In various embodiments, the charging station includes at least one charging pole; each charging pole comprising at least one LLC resonant converter module in accordance with the LLC resonant converter disclosed herein, wherein one or more electric vehicles are charged based on the output charging voltage of one or more LLC resonant converter modules.

In various embodiments, two or more LLC resonant converter modules of each charging pole are arranged in parallel to provide fast charging power to one or more electric vehicles.

BRIEF DESCRIPTION OF THE DRAWINGS

The drawings included herewith are for illustrating various examples of articles, methods, and apparatuses of the present specification and are not intended to limit the scope of what is taught in any way. In the drawings.

Figure 1:
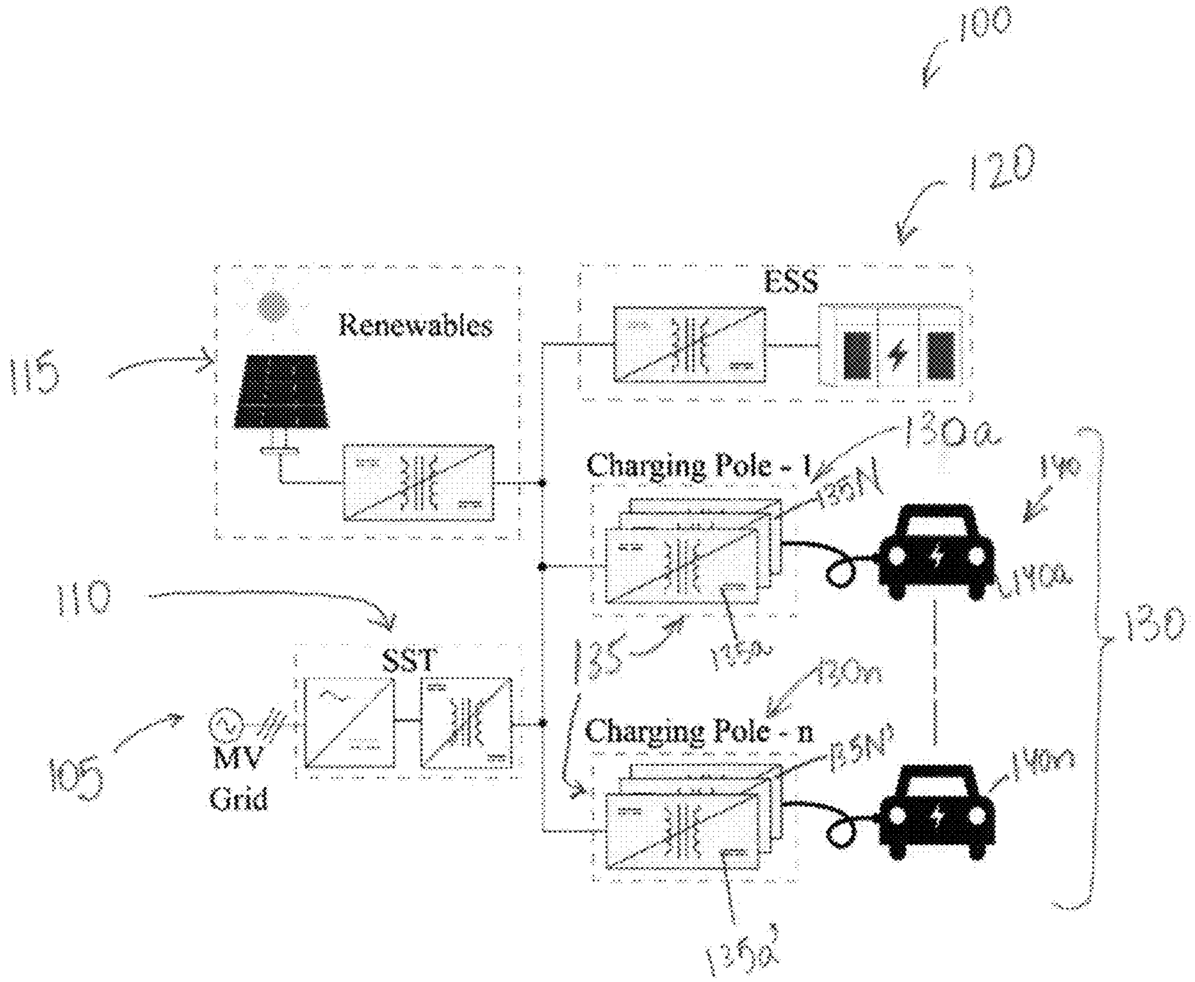
FIG. 1 is a schematic view of a direct current (DC)-connected charging station in accordance with an embodiment.

The drawings, described below, are provided for purposes of illustration, and not of limitation, of the aspects and features of various examples described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112*a*, or 1121). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

There can be several barriers to the widespread adoption of electric vehicles (EVs). One such barrier is the lack of an ultra-fast and efficient EV charging solution. Another barrier is the lack of a cost-effective charging solution. Furthermore, typical electric car battery voltage is around 400V. However, the next generation of EVs, such as Auston Martin and Porsche, are developed with 800V battery systems, to increase the charging power without increasing the charging current and losses. Therefore, the charging systems are required to cover a wide range of voltages, such as, for example, a voltage range of 200-1000V to cover the typical present and future electric car batteries.

DC-connected charging station systems, in contrast to AC-connected charging station systems, have been recognized to provide many advantages. For example, DC-connected charging stations can promote decarbonization by, for example, allowing the integration of renewable energy sources (RESs). DC-connected charging stations also tend to have fewer conversion stages compared to AC-connected stations, thereby reducing overall system cost by, for example, being smaller and more efficient.

LLC resonant converters have been widely utilized as DC/DC converter for EV fast chargers. LLC converters are based on resonant tanks, which are circuits made up of inductors and capacitors that oscillate at a specific frequency called the resonant frequency. LLC resonant converters typically provide the benefits of zero voltage-switching (ZVS), low electromagnetic interference (EMI) and high-efficiency operation. However, conventional LLC resonant converters tend to suffer from high circulating current causing high conduction losses. LLC resonant converters also tend to have complex designs if designed to provide a wide frequency range.

Described herein is an improved LLC resonant converter to address some of the disadvantages associated with conventional AC and/or DC charging stations and conventional LLC resonant converters. The improved LLC resonant converter disclosed herein is capable of providing a wide output voltage range, such as, for example, of 200-1000V without adding stress on the resonant components or resonant tank and without operating far from the unity gain point.

In addition, the improved LLC resonant converter disclosed herein provides a flexible structure to facilitate charging at higher power levels. For example, in various embodiments, the improved LLC resonant converter disclosed herein can be stacked with other similar converters to increase charging power.

The disclosed LLC resonant converter is also a configurable LLC resonant converter that provides the advantages of being modular and being able to maintain an overall high efficiency and device utilization. In the various embodiments disclosed herein, the LLC resonant converter has two secondary sub-units that are configurable to operate in series and parallel modes. The LLC resonant converter disclosed herein is also a full-bridge converter as discussed in detail below.

The improved LLC resonant converter disclosed herein is a DC-connected charger that operates on a DC-bus voltage. In the various embodiments disclosed herein, the proposed LLC resonant converter can connect directly to the fixed DC-bus of the charging station. In some cases, the DC-bus can be supplied by a two-stage low-frequency transformer and central front-end rectifier stage. In some other cases, the DC-bus can be supplied by a smaller, more efficient single-stage solid-state transformer (SST).

In some embodiments, the LLC resonant converter disclosed herein is used in EV charging stations. In some other embodiments, the LLC resonant converter disclosed herein is used as an on-board EV charger. In some further embodiments, the LLC resonant converter disclosed herein is used for remote or off-grid charging applications. In some embodiments, the LLC resonant converter disclosed herein is used for aerospace applications. In some other additional or alternative embodiments, the LLC resonant converter disclosed herein is used for marine applications. The LLC resonant converter disclosed herein can be used as a single module or in combination with other modules.

The wide voltage range of the LLC resonant converter disclosed in the various embodiments herein is critical for future proofing stations to support existing and next generation EVs, which makes it important to carefully select the LLC resonant converter parameters. In the various embodiments disclosed herein, the LLC resonant converter provides the advantage of maintaining a high efficiency and performance throughout the charging duration and over a wide output voltage range, as opposed to only specific instants in time and/or at specific output voltage points.

In various embodiments, selection of the LLC resonant converter parameters is based on an energy-based optimization strategy that considers the full range of charging scenarios of the LLC resonant converter. In various cases, the resonant converter components are optimized for the common EV charging profiles.

In some cases, the energy-based optimization is based on data collected from actual EV charging sessions. In some other cases, the energy-based optimization is based on data collected from simulations of EV charging sessions. In the various embodiments disclosed herein, the optimization of the LLC resonant converter parameters is based on time-domain analytical models to achieve just the required output voltage range without unnecessarily wide range, which increases the converter circulating current and compromises the converter's efficiency.

Reference is made to FIG. 1, which illustrates a schematic view of a DC-connected charging station 100 in accordance with an example embodiment. Charging station 100 consists of a medium voltage (MV) grid 105, a solid-state transformer (SST) 110, a renewable power source(s) 115, an energy storage system (ESS) 120, a plurality of charging poles 130, a plurality of LLC resonant converters 135 and a plurality of vehicles 140.

The plurality of charging poles 130 are equipped with one or more LLC resonant converters to charge one or more electric vehicles 140 at any given time. For example, as illustrated, charging pole 130*a* consists of 'N' LLC resonant converters 135*a*, . . . , 135N. Similarly, charging pole 130*n* consists of 'N' LLC resonant converters 135*a*', . . . , 135N'. Vehicle 140*a* can be charged using the LLC resonant converter 135*a* at charging pole 130*a*, and vehicle 140*n* can be charged using LLC resonant converter 135*a*' at charging pole 130*n*.

In the various embodiments disclosed herein, each LLC resonant converter 135 can have a universal output voltage range. For example, in some cases, the universal output voltage range can extend from 200V to 1000V and a power level of 10 kW. In other cases, the power level of the LLC resonant converter can be much higher than 10 kW.

In some embodiments, a fast-charging pole, such as a charging pole 130 of FIG. 1, is composed of a single LLC resonant converter module 135. In various embodiments disclosed herein, a charging pole 130 of FIG. 1 is composed of multiple LLC resonant converter modules 135. In some embodiments, the LLC resonant converters 135 of each charging pole 130 can be combined in parallel to increase the charging power to ultra-fast power levels, such as, for example, power levels above 350 kW. In such embodiments, the transitioning between the operating modes for each module can be done in a series fashion. Hence, at any instant, there will be power delivered to the electric vehicle.

Figure 2A:
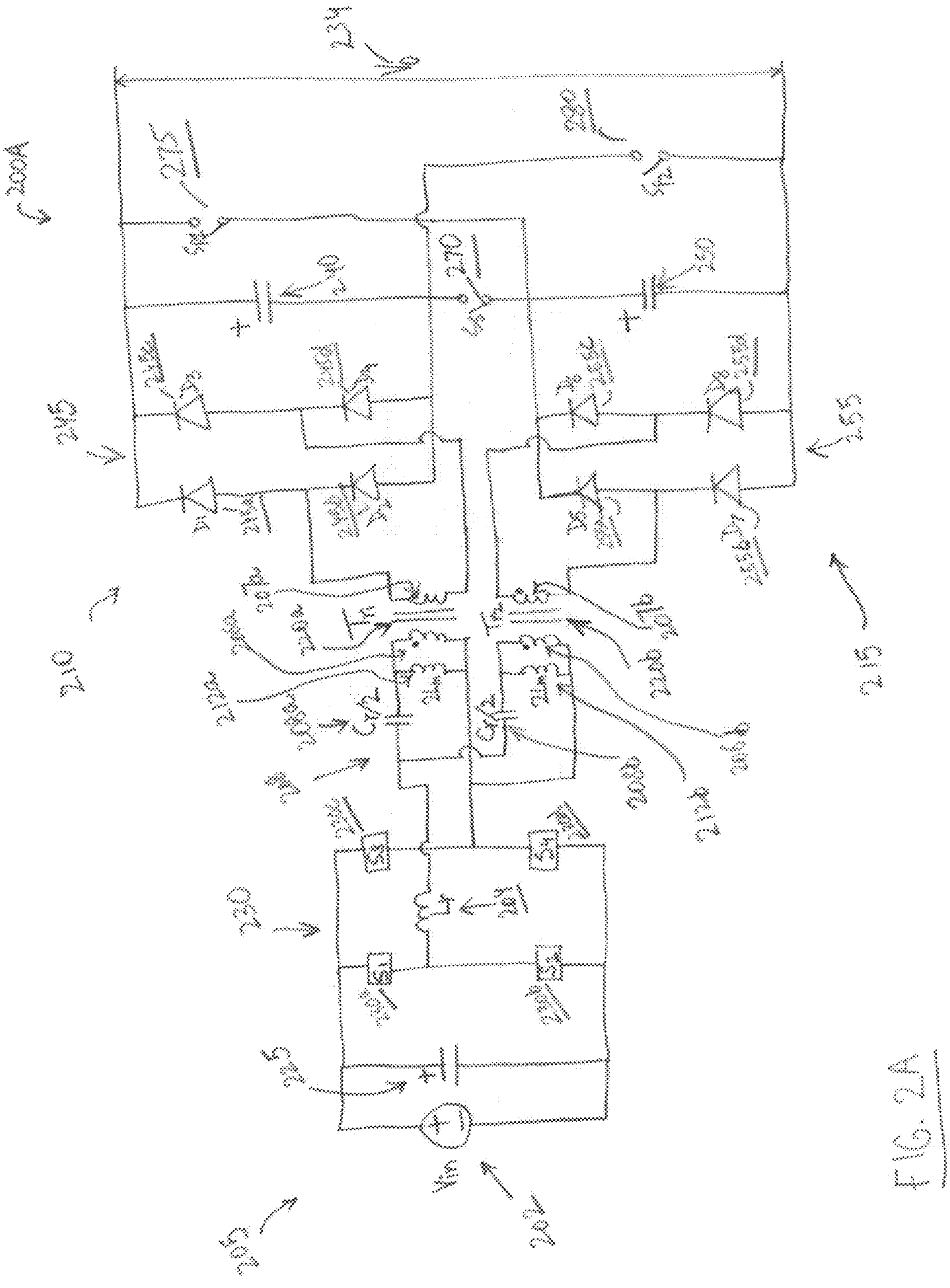
FIG. 2A is a schematic view of an LLC resonant converter according to an embodiment.

Reference is next made to FIG. 2A, which illustrates a schematic view of a LLC resonant converter 200A, according to an example embodiment. The LLC resonant converter 200A disclosed herein consists of a primary sub-circuit 205, a first secondary sub-circuit 210 and a second secondary sub-circuit 215.

The LLC resonant converter 200A shown herein operates at a fixed input DC-bus voltage ($V_{in}$) 202. The primary sub-circuit 205 consists of an input capacitor 225 and four switches 230 arranged in a full-bridge topology. The four switches 230 include a first primary switch 230*a*, second primary switch 230*b*, third primary switch 230*c* and fourth primary switch 230*d*. In the various embodiments illustrated herein, the primary switches 230 used in the LLC resonant converter 200A are MOSFETs.

The primary sub-circuit 205 also includes a resonant inductor ($L_r$) 204 and two parallel branches of a combination of a resonant capacitor ($C_r$) and magnetizing inductance ($L_m$). Each parallel branch includes half the required resonant capacitor and double the required magnetizing inductance. Accordingly, the primary sub-circuit 205 includes a resonant capacitor ($C_r$) 208 split into two, namely a first resonant capacitor ($C_r/2$) 208*a* and a second resonant capacitor ($C_r/2$) 208*b*.

As shown, the primary sub-circuit 205 and the secondary sub-circuits 210, 215 are coupled with each other using a first transformer ($T_{r1}$) 220*a* and a second transformer ($T_{r2}$) 220*b*. The transformers 220*a,b* are used to provide isolation between the primary and secondary sub-circuits.

As illustrated, each transformer 220*a*, 220*b* has a corresponding magnetizing inductance ($2L_m$) on the primary side, namely a first magnetizing inductance 212*a* and a second magnetizing inductance 212*b*. In the various embodiments illustrated herein, $L_m$ is the required magnetizing inductance, and each branch on the primary side includes double the required magnetizing inductance.

In the illustrated embodiment, the transformers 220*a,b* are designed to have a low leakage inductance. In various embodiments, the two primary windings 206*a*, 206*b* have equal number of turns, and two secondary windings 207*a*, 207*b* have equal number of turns. This provides the advantage of symmetric performance by the LLC resonant converter 200A.

The first secondary sub-circuit 210 consists of a first output capacitor 240 and a first diode full-bridge rectifier 245. The first diode full-bridge rectifier 245 includes a first diode 245*a*, a second diode 245*b*, a third diode 245*c* and a fourth diode 245*d*. The first secondary sub-circuit 210 also includes a first output capacitor 240.

The second secondary sub-circuit 215 consists of a second output capacitor 250 and a second diode full-bridge rectifier 255. The second diode full-bridge rectifier 255 includes a first diode 255*a*, a second diode 255*b*, a third diode 255*c* and a fourth diode 255*d*. The second secondary sub-circuit 215 also includes a second output capacitor 250.

The LLC resonant converter 200A has two operating modes, namely a series mode and a parallel mode. To facilitate the transition between the two operating modes, the LLC resonant converter 200A comprises a first transition switch 270, a second transition switch 275 and a third transition switch 280. The first, second and third transition switches 270, 275, 280 are bidirectional switches. In some cases, the first, second and third transition switches 270, 275, 280 are relays. In some other cases, the first, second and third transition switches 270, 275, 280 are any low frequency, bidirectional switches. In various embodiments disclosed herein, the first, second and third transition switches 270, 275, 280 are contactors. In addition to facilitating switching of the LLC resonant converter 200A between the two modes of operation, the contactors may also provide the benefit of protecting and isolating the secondary sub-circuits 210, 215 for safe operation.

Figure 2B:
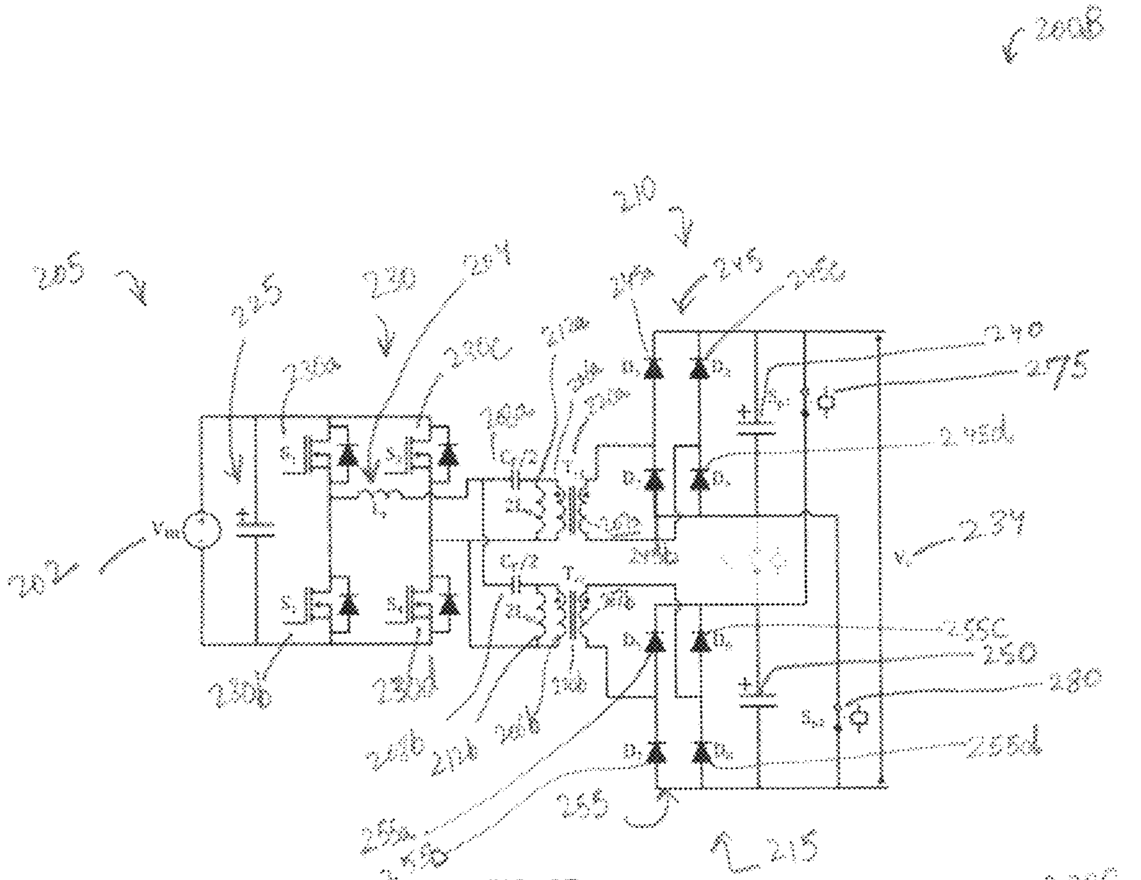
FIG. 2B is a schematic view of an LLC resonant converter according to another embodiment.
Figure 2C:
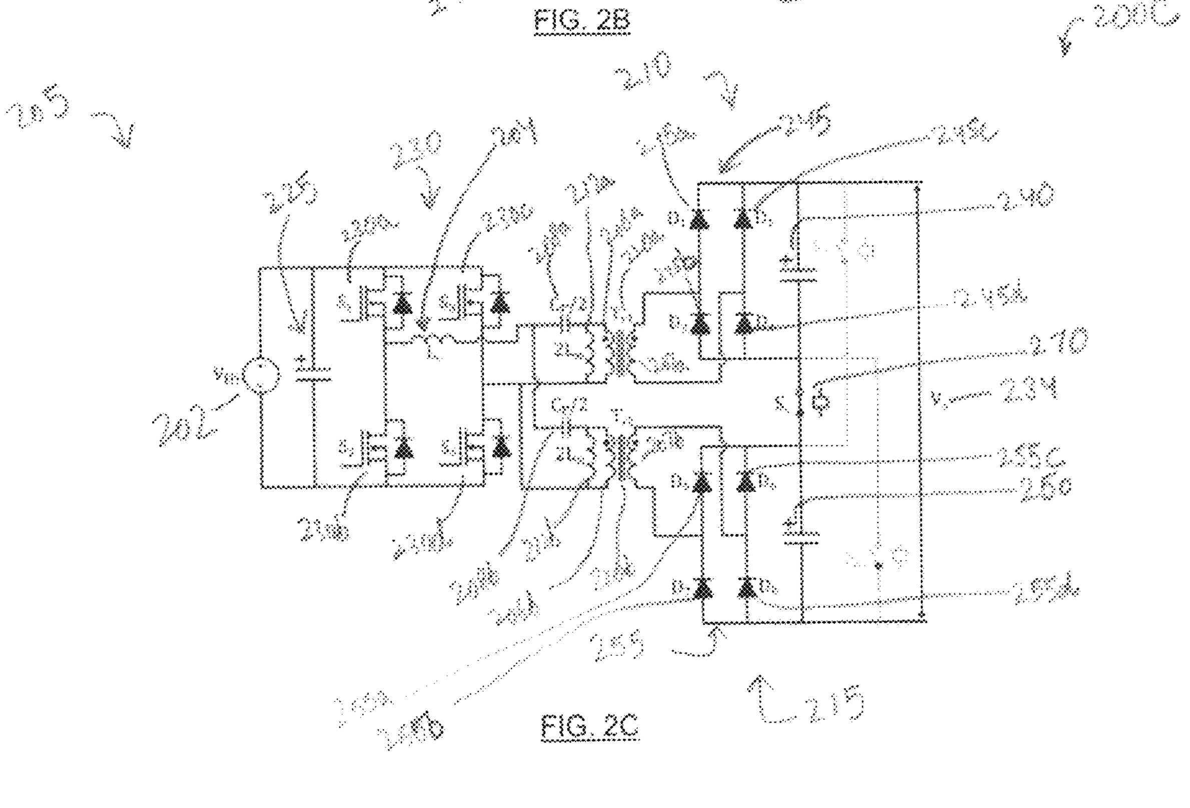
FIG. 2C is a schematic view of an LLC resonant converter according to a further embodiment.

FIG. 2B illustrates the schematic view of the LLC resonant converter 200A in the parallel output mode (PM) 200B. FIG. 2C illustrates the schematic view of the LLC resonant converter 200A in the series output mode (SM) 200C. SM topology 200C can be used for high-voltage applications, and PM topology 200B can be used for high-power applications.

As illustrated in FIG. 2B, in the parallel mode operation, the first and the second secondary sub-circuits 210,215 are connected in parallel. This results in lower output voltage ($V_{out}$) 234. In this mode of operation, the voltage output of the first and the second secondary sub-units is equal to each other, which is equal to output voltage ($V_{out}$) 234. For the LLC resonant converter 200A to transition to parallel mode of operation, the first transition switch 270 is open, and the second and third transition switches 275, 280 are closed.

As illustrated in FIG. 2C, in the series mode of operation, the first and the second secondary sub-circuits 210, 215 are connected in series. This provides the advantage of high output voltage ($V_{out}$) 234. In the series mode operation, the output current of each secondary sub-circuit 210, 215 is equal to each other, which is equal to overall output current. For the LLC resonant converter 200A to transition to the series mode of operation, the first transition switch 270 is closed, and the second and third transition switches 275, 280 are open.

The topology of the LLC resonant converter disclosed herein adds another unity gain point that allows the converter to operate in the vicinity of the resonant frequency. This provides the advantage of limiting the efficiency drop over the wide gain range. This is illustrated in further detail with reference to FIG. 20.

In addition, the topology of the LLC resonant converter disclosed herein provides the advantage of equal current sharing between the two secondary outputs in the parallel mode by splitting the resonant capacitor ($C_r$) 208 among the two transformers 220*a*, 220*b* on the primary side. By adding the resonant capacitor ($C_r$) impedance in each path, the tolerances between the parasitic impedances in the two secondary sub-circuits 210, 215 can be neglected compared to the split resonant capacitance impedance. As a result, the current is divided equally between the two secondary sub-circuits 210, 215.

In some other embodiments, current sharing between the secondary sub-circuits 210, 215 can be realized by splitting the resonant inductor. However, splitting the resonant inductor, instead of the resonant capacitor, may result in more components being utilized, resulting in lower power density. For example, in embodiments where the resonant inductor is split, while the current sharing can be achieved, the converter will require double the resonant inductor value and half the current rating in each path to get the required resonant inductor. This increases the component footprint. On the other hand, by splitting the resonant capacitor, additional capacitance is not required in the converter, since the equivalent of the resonant capacitors provides the required resonant capacitance.

In various embodiments, a First Harmonic Approximation (FHA) analysis is carried out to model the current sharing between the output rectifiers 245, 255 in the parallel mode to ensure equal current sharing. This is discussed in further detail with reference to FIG. 10 below.

Figure 3A:
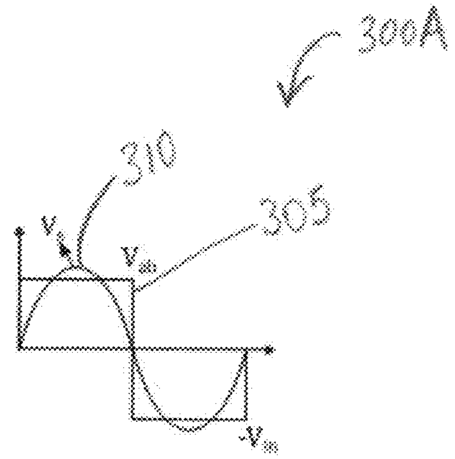
FIG. 3A is a schematic equivalent view of an LLC resonant converter according to an example embodiment.
Figure 3B:
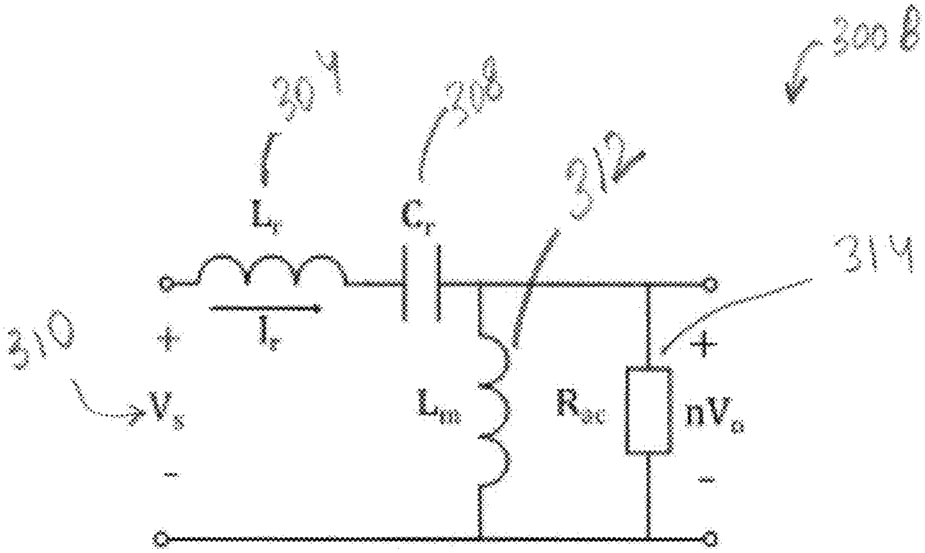
FIG. 3B is a schematic equivalent view of an LLC resonant converter according to another example embodiment.

Reference is next made to FIGS. 3A and 3B, which illustrate a schematic equivalent view 300A, 300B, respectively, of an LLC resonant converter according to an example embodiment. FIGS. 3A and 3B specifically illustrate a FHA model of an LLC resonant converter, such as the LLC resonant converters 200A-200C disclosed herein.

In the illustrated embodiment of FIG. 3A, $V_s$ 310 is the first harmonic component of the H-bridge output voltage of the resonant tank ($V_{ab}$) 305. The FHA model of the LLC resonant converter illustrated in FIG. 3B includes a resonant inductor 304 connected in series with the resonant capacitor 308, which is connected in series with a parallel combination of magnetizing inductor 312 and resistor 314.

The resonant tank of the illustrated embodiment has two resonant frequencies, namely the first resonant frequency ($f_r$) and the second resonant frequency ($f_m$). The first resonant frequency ($f_r$) is determined based on equation (1) and the second resonant frequency ($f_m$) is determined based on equation (2) shown below:

$$f_\gamma = \frac{1}{2\pi\sqrt{L_r \cdot C_r}} \tag{1}$$

$$f_m = \frac{1}{2\pi\sqrt{(L_r + L_m)\cdot C_r}} \tag{2}$$

In the various embodiments illustrated herein, the switching frequency ($f_{sw}$) of the LLC resonant converter is higher than the second resonant frequency ($f_m$). This provides the advantage of operation of the LLC resonant converter in the inductive region, where the current lags the voltage, so that zero voltage switching is achieved. The conversion gain ration of the LLC resonant converter is determined based on equation (3) below:

$$M_g = \frac{L_n f_n^2}{\left[(1 + L_n)f_n^2 - 1\right] + j\left[\left(f_n^2 - 1\right)f_n Q_e L_n\right]} \tag{3}$$

$L_n$ in equation (3) is the inductance ratio determined based on equation (4) below:

$$L_n = L_m / L_r \tag{4}$$

$Q_e$ in equation (3) is a quality factor that is represented based on equation (5) below:

$$Q_e = \sqrt{\frac{L_r}{c_r}} / R_{ac} \tag{5}$$

$f_n$ in equation (3) is the normalized switching frequency to the resonant frequency ($f_r$), and is determined based on equation (6), where $f_{sw}$ is the converter switching frequency:

$$f_n = f_{sw} / f_r \tag{6}$$

Figure 4:
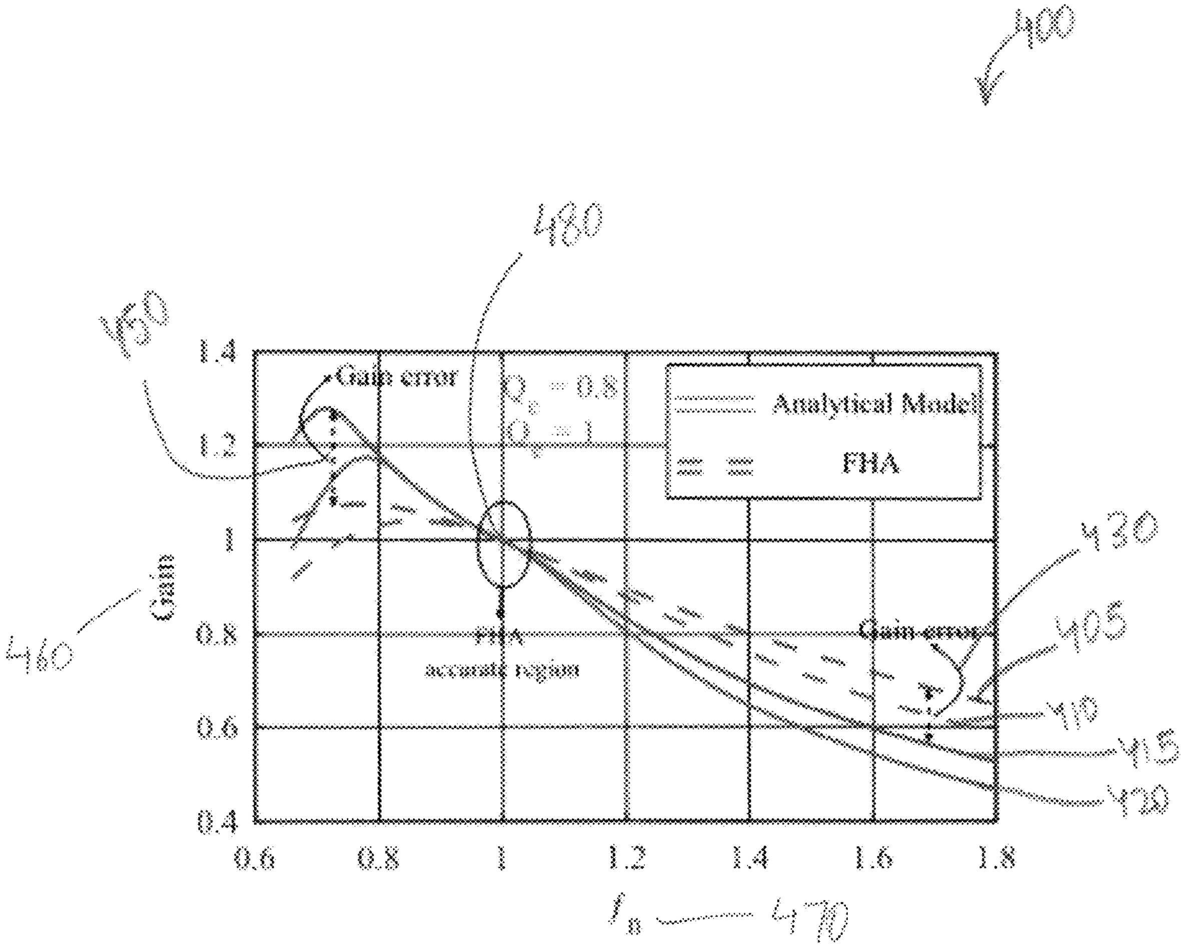
FIG. 4 is a graphical representation of an LLC resonant converter parameter according to an example embodiment.

Reference is next made to FIG. 4, which illustrates a graphical representation 400 of an LLC resonant converter parameter according to an example embodiment. FIG. 4 specifically illustrates the relationship between the gain 460 and the normalized switching frequency 470 of the LLC resonant converter. The relationship between the gain and the normalized switching frequency is expressed based on both the FHA analysis and the steady state analytical model of the LLC resonant converter. The analytical model is based on time-domain analysis.

As shown, plot 405 illustrates the FHA gain of the LLC resonant converter with quality factor ($Q_e$) of 0.8. Plot 415 illustrates the steady state analytical model gain curve of the LLC resonant converter with quality factor ($Q_e$) of 0.8. Similarly, plot 410 illustrates the FHA gain of the LLC resonant converter with quality factor ($Q_e$) of 1. Plot 420 illustrates the steady state analytical model gain curve of the LLC resonant converter with quality factor ($Q_e$) of 1.

Reference 430 represents the gain error between plots 405 and 415 at the normalized switching frequency ($f_n$) of 1.7. Reference 450 represents the gain error between plots 405 and 415 at the normalized switching frequency ($f_n$) of 0.7.

As shown in graph 400, FHA accurate region 480 (i.e. the region where the FHA and analytical models illustrate the same gain) is realized at normalized switching frequency ($f_n$) of 1. However, FHA has poor accuracy when used at frequencies far from the resonant frequency. As shown, FHA may have the disadvantage of underestimating the gain performance of the converter, resulting in over-designed parameters, which may increase the circulation current and conduction losses associated with the LLC resonant converter. Therefore, in various embodiments illustrated herein, the time-domain analytical model is used to determine the parameters of the LLC resonant converter to meet the power and voltage range requirements.

Figure 5A:
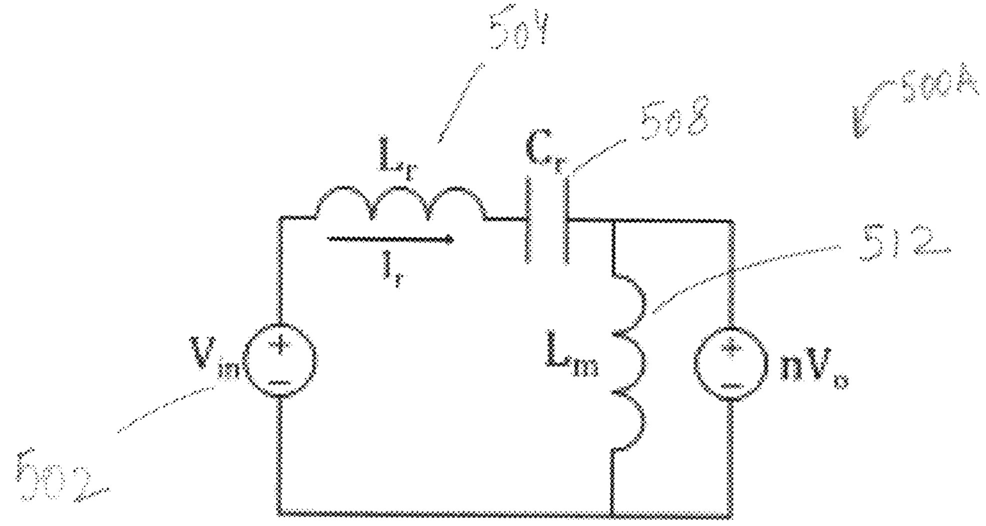
FIG. 5A is a schematic equivalent view of an LLC resonant converter according to an example embodiment.
Figure 5B:
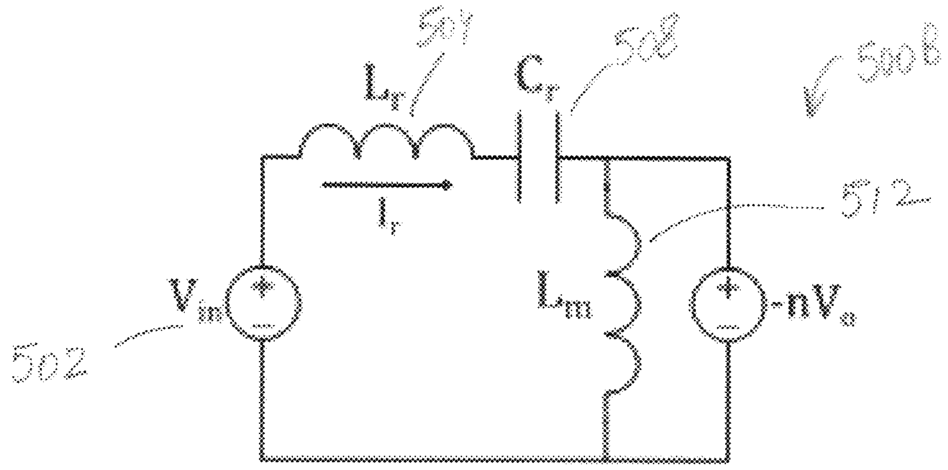
FIG. 5B is a schematic equivalent view of an LLC resonant converter according to another example embodiment.
Figure 5C:
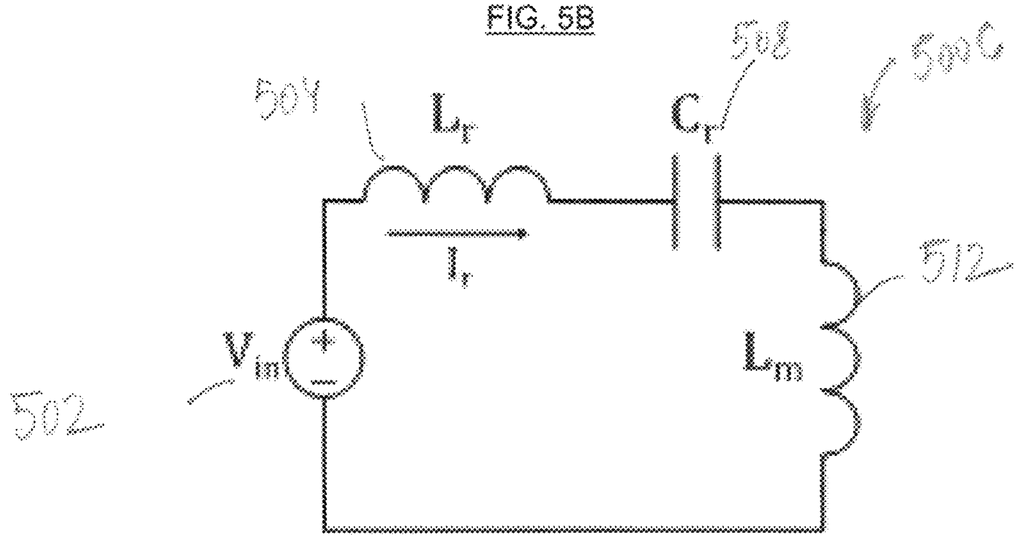
FIG. 5C is a schematic equivalent view of an LLC resonant converter according to a further example embodiment.

Reference is next made to FIGS. 5A-5C, which illustrate time-domain analytical model equivalent circuits of LLC resonant converter. In the LLC resonant converter analytical model, there are three equivalent circuits at the positive half-cycle and three equivalent circuits at the negative half-cycle. Since the converter waveforms are symmetrical for the two sets of equivalent circuits, only the positive half-cycle equivalent circuits are illustrated in FIGS. 5A-5C. As shown, the analytical model equivalent circuit consists of input voltage 502 connected in series with resonant inductor ($L_r$) 504 and resonant capacitor ($C_r$) 508, which are connected in series with the parallel combination of magnetizing inductor ($L_m$) 512 and the reflected voltage of the transformer in a LLC resonant converter circuit, such as those illustrated in FIGS. 2A-2C.

FIG. 5A illustrates an equivalent circuit 500A at state A, where the transformer reflected voltage is clamped to the positive output voltage. FIG. 5B illustrates an equivalent circuit 500B at state B, where the reflected voltage on the primary side is clamped to the negative output voltage. FIG. 5C illustrates an equivalent circuit 500C at state C, where the diode full-bridge rectifiers 245, 255 are all switched off and the converter primary side is isolated from the output voltage.

Each state illustrated herein has its own state equations. At each output voltage and load, the LLC resonant converter operates at different modes formed by different sequences of the three states. In various embodiments, the steady state model solution is achieved by considering the constrains of each operating mode then solving the steady-state equations together numerically.

Figure 6A:
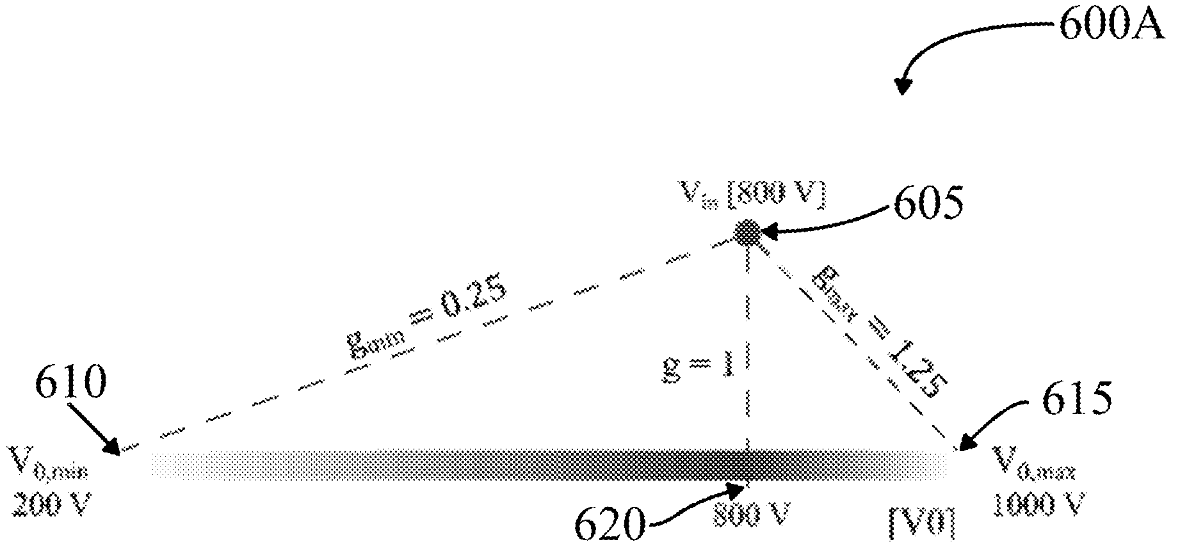
FIG. 6A is a graphical representation of gain of a conventional converter according to an example embodiment.
Figure 6B:
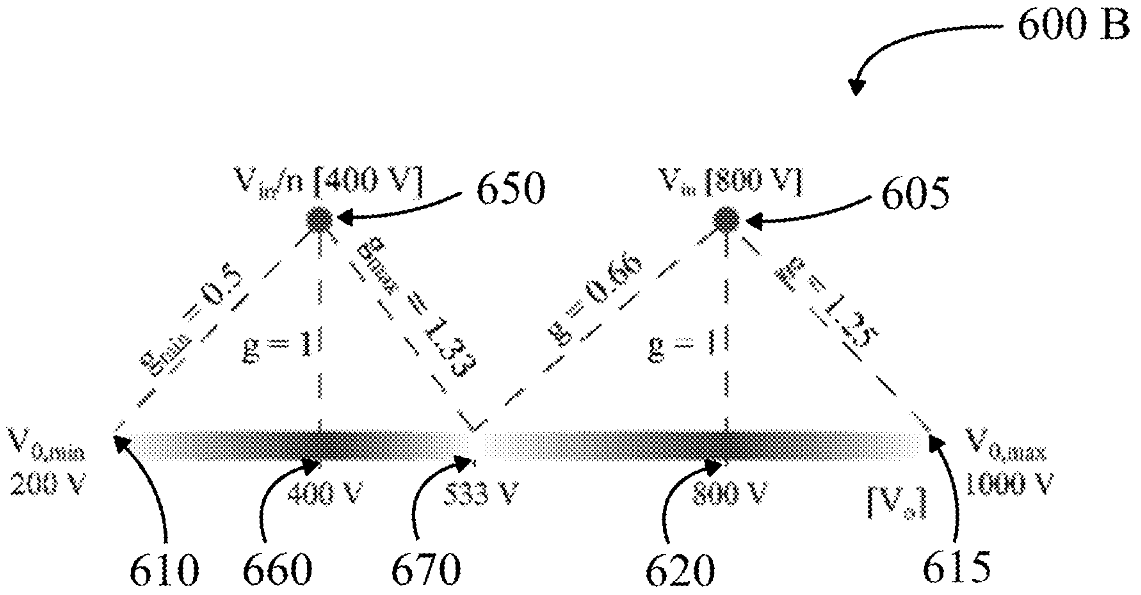
FIG. 6B is a graphical representation of gain of an LLC resonant converter according to another example embodiment.

Reference is next made to FIG. 6A, which illustrates a graphical representation 600A of resonant tank gain of a conventional converter according to an example embodiment. FIG. 6B illustrates a graphical representation 600B of resonant tank gain of an LLC resonant converter according to embodiments disclosed herein. The resonant tank gain (g) range has been determined based on equation (7):

$$g = \frac{nV_o}{V_{in}} \tag{7}$$

FIG. 6A illustrates an input voltage 605 of 800V, and output voltage range with minimum output voltage ($V_{o,min}$) 610 of 200V to maximum output voltage ($V_{o,max}$) 615 of 1000V. The resonant tank gain of 1 is achieved at output voltage of 800V shown by reference number 620. The gain range in this embodiment extends from minimum gain ($g_{min}$) of 0.25 to maximum gain ($g_{max}$) of 1.25.

FIG. 6B illustrates the converter resonant tank gain for the reconfigurable LLC resonant converter disclosed here. FIG. 6B illustrates an operation range with an input voltage 650 of 400V, enabling an output voltage range with a minimum output voltage ($V_{o,min}$) 610 of 200V to a maximum output voltage ($V_{o,max}$)' 670 of 533V. In this operation range, the resonant tank gain of 1 is achieved at output voltage of 400V shown by reference number 660. The gain range in this embodiment extends from minimum gain ($g_{min}$) of 0.5 to maximum gain ($g_{max}$) of 1.33.

FIG. 6B also shown another operation range with an input voltage 605 of 800V, and output voltage range with minimum output voltage ($V_{o,min}$)' 670 of 533V to maximum output voltage ($V_{o,max}$) 615 of 1000V. The resonant tank gain of 1 is achieved at output voltage of 800V shown by reference number 620. The gain range in this embodiment extends from 0.66 to 1.25.

The LLC resonant converter disclosed herein, such as the LLC resonant converter of FIGS. 2A-2C, reflects the same load on the primary side resonant tank during the two secondary configurations of series mode (SM) and parallel mode (PM), allowing the converter to operate at the same conditions, such as quality factor ($Q_e$) and normalized switching frequency ($f_n$). By reducing the converter gain and load ranges, various advantages can be realized. For example, the resonant tank parameters design can be drastically simplified.

Additionally, by reducing the converter gain and load ranges, the circulating current in the primary current is reduced, which provides the advantage of increasing the efficiency and allowing the usage of lower current ratings primary side switches, resonant components and a smaller transformer. Similarly, by reducing the converter gain and load ranges, each rectifier is only subjected to half the output voltage, which reduces the secondary side devices voltage rating. The topology modularity of the LLC resonant converter also provides the advantage of full utilization of all components at the two modes. The advantages of the LLC resonant converter are further discussed in associated with FIGS. 7A-7B and 8A-8B.

Figure 7A:
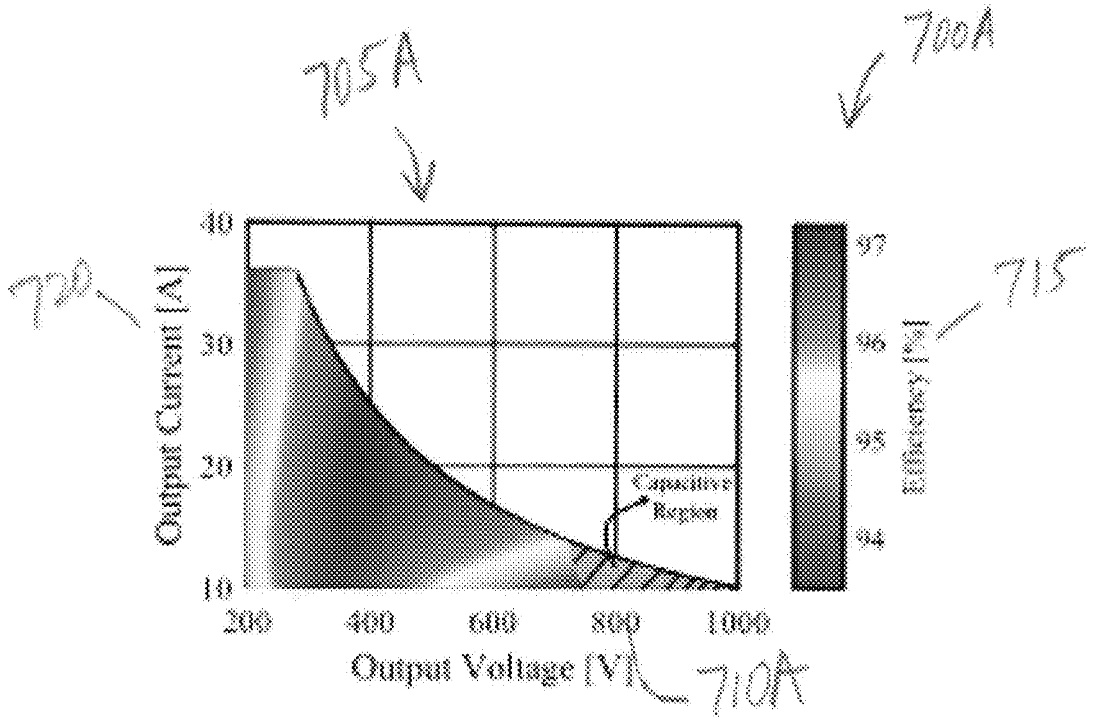
FIG. 7A is a graphical representation of efficiency of a conventional converter according to an example embodiment.
Figure 7B:
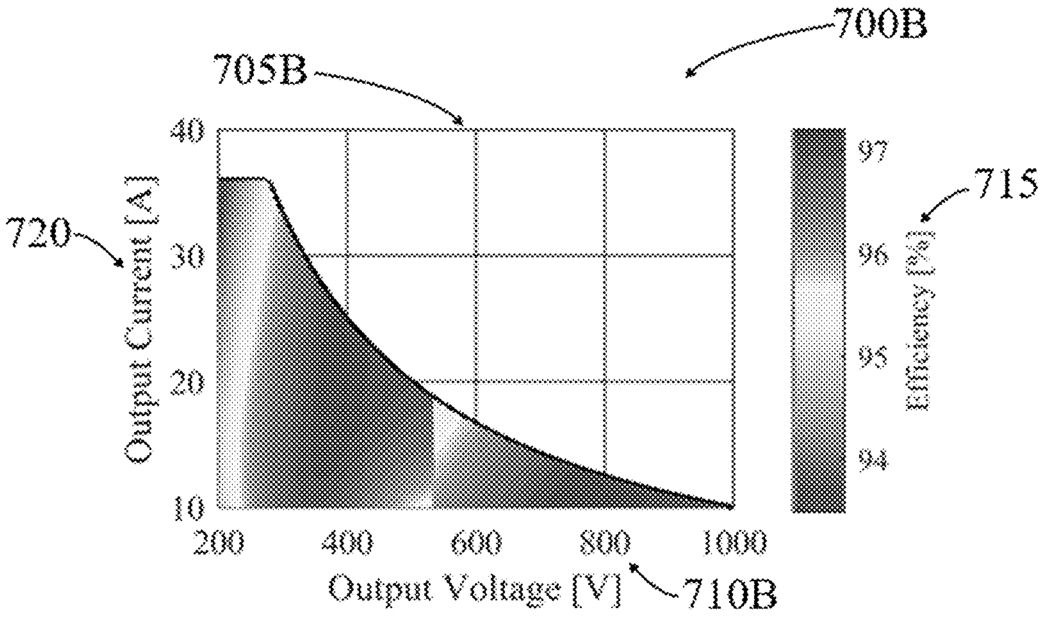
FIG. 7B is a graphical representation of efficiency of an LLC resonant converter according to another example embodiment.

Reference is made to FIG. 7A, which illustrates a graphical representation 700A of an efficiency map of a conventional converter according to an example embodiment. FIG. 7B illustrates a graphical representation 700B of efficiency of an LLC resonant converter of the embodiments disclosed herein. Graphs 700A and 700B illustrate efficiency maps 705A, 705B of respective converters.

Graphs 700A and 700B are generated based on time domain analytical models. The conventional converter associated with FIG. 7A and the LLC resonant converter disclosed here, associated with FIG. 7B, are compared at the same values for various converter parameters, such as, resonant inductor ($L_r$), resonant capacitor ($C_r$), required magnetizing inductance ($L_m$) and number of turns n associated with the transformer.

As illustrated, the LLC resonant converter disclosed here covers a wider output voltage range 710B compared to the output voltage range 710A of conventional converters. Both converters have a peak efficiency 715 of 97.2% based on the analytical loss analysis. However, the LLC resonant converter disclosed here keeps a high efficiency over most of the converter output voltage range, as shown in FIG. 7B.

Figure 8A:
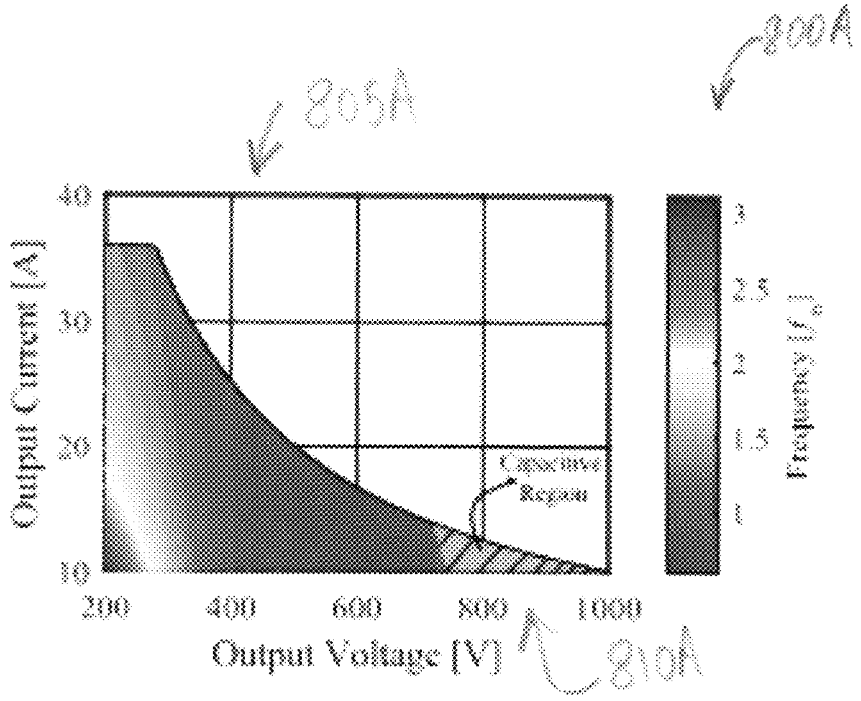
FIG. 8A is a graphical representation of frequency map of a conventional converter according to an example embodiment.
Figure 8B:
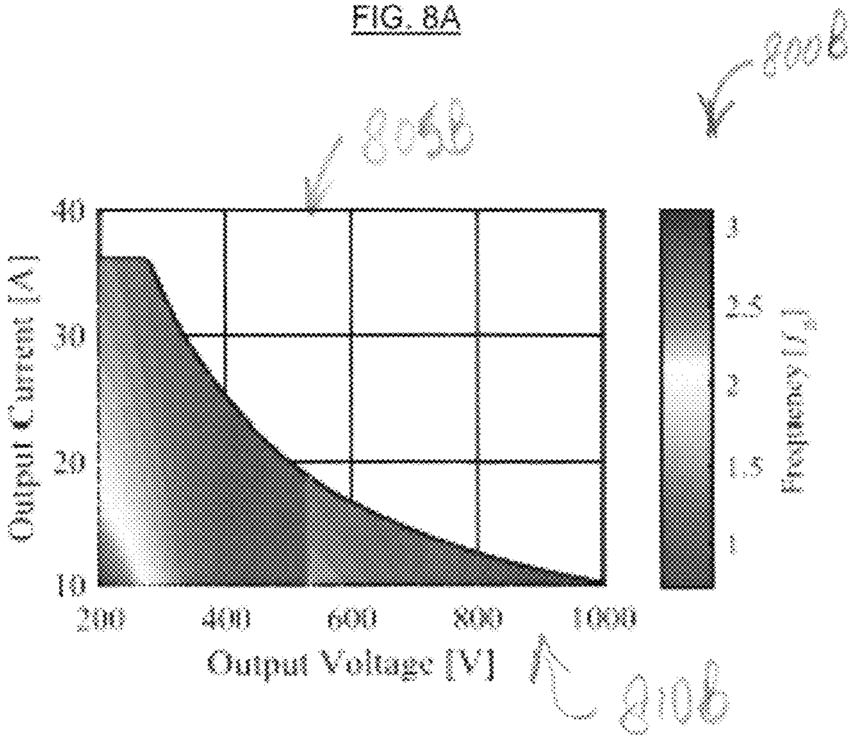
FIG. 8B is a graphical representation of frequency map of an LLC resonant converter according to another example embodiment.

Reference is next made to FIGS. 8A and 8B, which illustrate a graphical representation 800A, 800B of a frequency range of a conventional converter (FIG. 8A) and an LLC resonant converter according to embodiments disclosed herein (FIG. 8B). Graphs 800A and 800B illustrate frequency maps 805A, 805B of respective converters.

As illustrated in FIG. 8A, the conventional converter covers the output voltage range 810A of about 200V to 740 V with the frequency range 805A of [0.6-3]×$f_r$. In contrast, as illustrated in FIG. 8B, the LLC resonant converter disclosed here covers the output voltage range 810B of about 200V to 1000V with the frequency range 805B of [0.7-3]×$f_r$.

Figure 22:
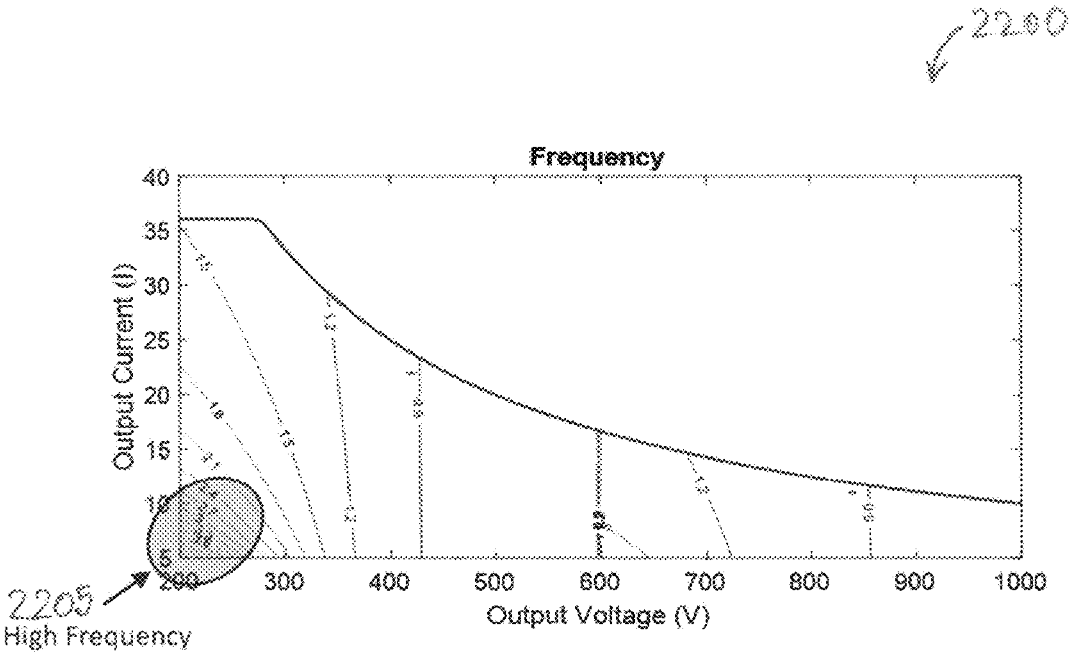
FIG. 22 is a graphical representation of a frequency range of an LLC resonant converter according to an example embodiment.

Reference is briefly made to FIG. 22, which illustrates another embodiment of a graphical representation 2200 of a frequency range of an LLC resonant converter. The LLC resonant converter illustrated in this FIG. 22 is controlled using pulse frequency modulation (PFM). In various embodiments, the PFM control provides the advantage of wide voltage regulation and zero-voltage switching at most of the operating region.

As illustrated, for low voltage gain operation, the LLC resonant converter operates at very high switching frequencies ($f_s$), illustrated using reference number 2205. In various embodiments, high switching frequencies result in higher electromagnetic interference and high converter losses. In various embodiments, wide switching frequency operation complicates the EMI filter design and increases the size of the transformer. This may be undesirable for certain EV fast chargers, such as, for example, a 60 kW EV fast charger that has to cover voltage range of [200-920] V and power range of [0.2-60] kW. In such cases, an improved control technique, as discussed with reference to FIG. 23, can be used.

Figure 9A:
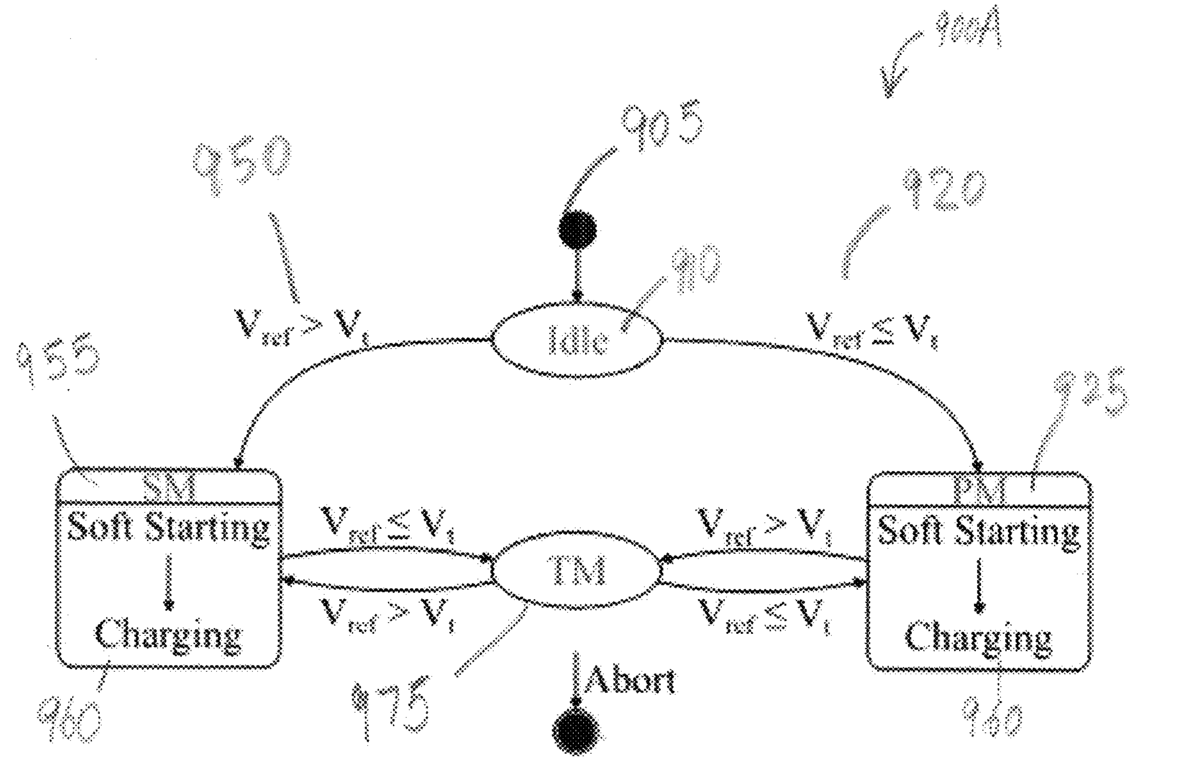
FIG. 9A is a schematic view of a state machine model of an LLC resonant converter according to an example embodiment.
Figure 9B:
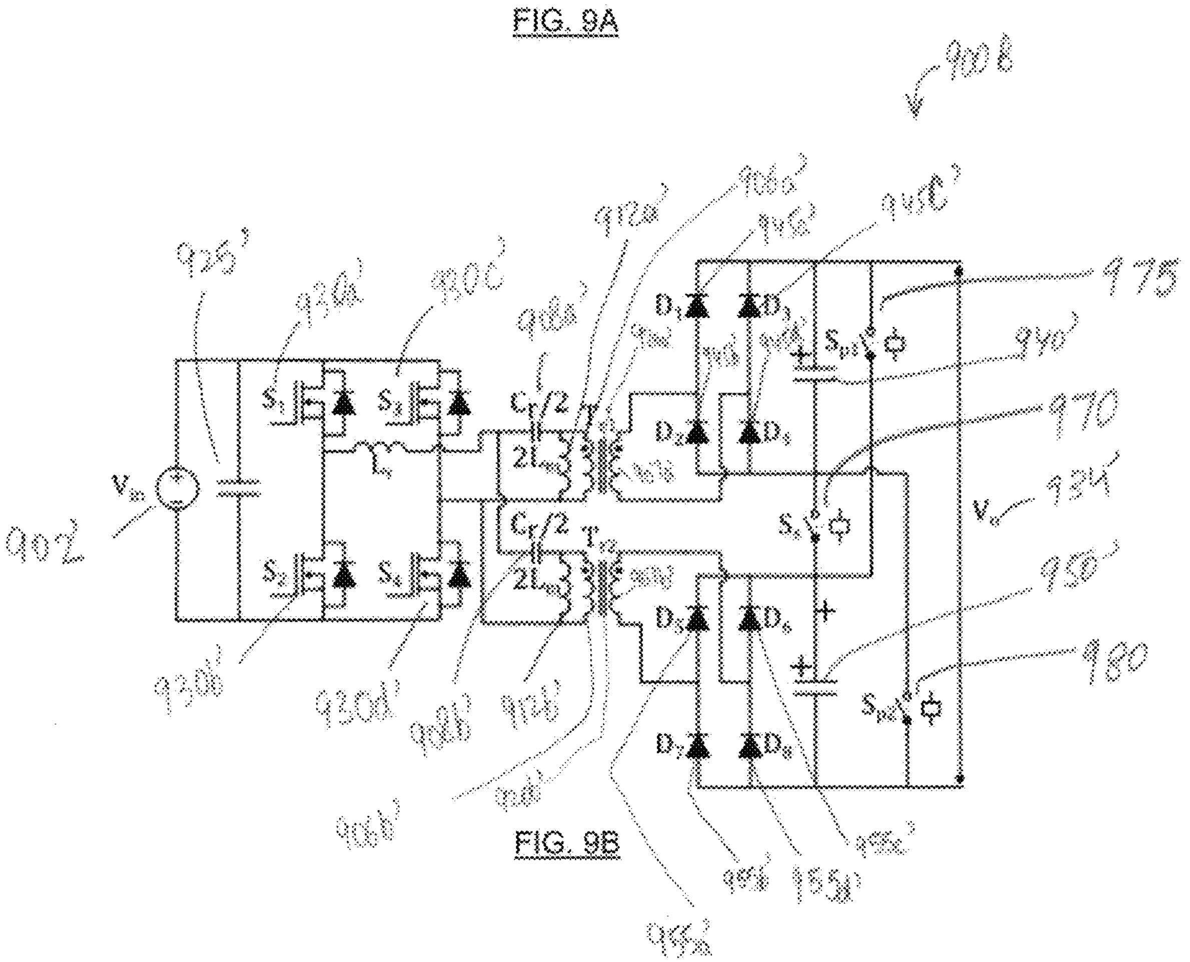
FIG. 9B is a schematic view of an LLC resonant converter according to an example embodiment.

Reference is next made to FIG. 9A, which illustrates a schematic view 900A of a state machine model of an LLC resonant converter, such as the LLC resonant converter of FIGS. 2A-2C. Reference is also made to FIG. 9B illustrating a schematic representation 900B of the LLC resonant converter disclosed herein. As illustrated, when a charging session of an electric vehicle is started, the LLC resonant converter powers on at 905 and goes into an idle state 910. The operation mode of the LLC resonant converter is selected based on the demanded output charging voltage.

As illustrated in FIG. 9A, the demanded output charging voltage is compared with the determined transition voltage ($V_{transition}$). If it is determined that the demanded output charging voltage ($V_{ref}$) is lesser than or equal to the transition voltage ($V_{transition}$) at step 920, the parallel mode (PM) 925 is selected. In the PM, the first transition switch 970 is open, and the second and third transition switches 975, 980 are closed.

If it is determined that the demanded output charging voltage ($V_{ref}$) is greater than the transition voltage ($V_{transition}$) at step 950, the series mode (SM) 955 is selected. In the SM, the first transition switch 970 is closed, and the second and third transition switches 975, 980 are open.

Also illustrated in FIG. 9A is a transition mode (TM) 975, which assists in the transition between the PM and SM during the operation of the LLC resonant converter. At the TM, all the transition switches, i.e. the first transition switch 970, the second transition switch 975 and the third transition switch 980 are open. In embodiments where all the transition switches are contactors, all the contactors are turned off in the transition mode. FIG. 9B illustrates an equivalent circuit of the transition mode. Reference numbers 902', 925', 930*a*', 930*b*', 930*c*', 930*d*', 906*a*', 906*b*', 907*a*', 907*b*', 908*a*', 908*b*', 912*a*', 912*b*', 945*a*', 945*b*', 945*c*', 945*d*', 955*a*', 955*b*', 955*c*', 955*d*', 940', 950' and 934' are analogous to reference numbers 202, 225, 230*a*, 230*b*, 230*c*, 230*d*, 206*a*, 206*b*, 207*a*, 207*b*, 208*a*, 208*b*, 212*a*, 212*b*, 245*a*, 245*b*, 245*c*, 245*d*, 255*a*, 255*b*, 255*c*, 255*d*, 240, 250 and 234 of FIGS. 2A-2C.

After transitioning to the PM operating mode 925 or SM operating mode 955, the LLC resonant converter starts operation to regulate the output for the demanded charging voltage and current. In various embodiments disclosed herein, a soft starting strategy 960 is implemented in both operating modes so that the converter reaches the demanded charging voltage before charging the vehicle to avoid in rush current.

Figure 10:
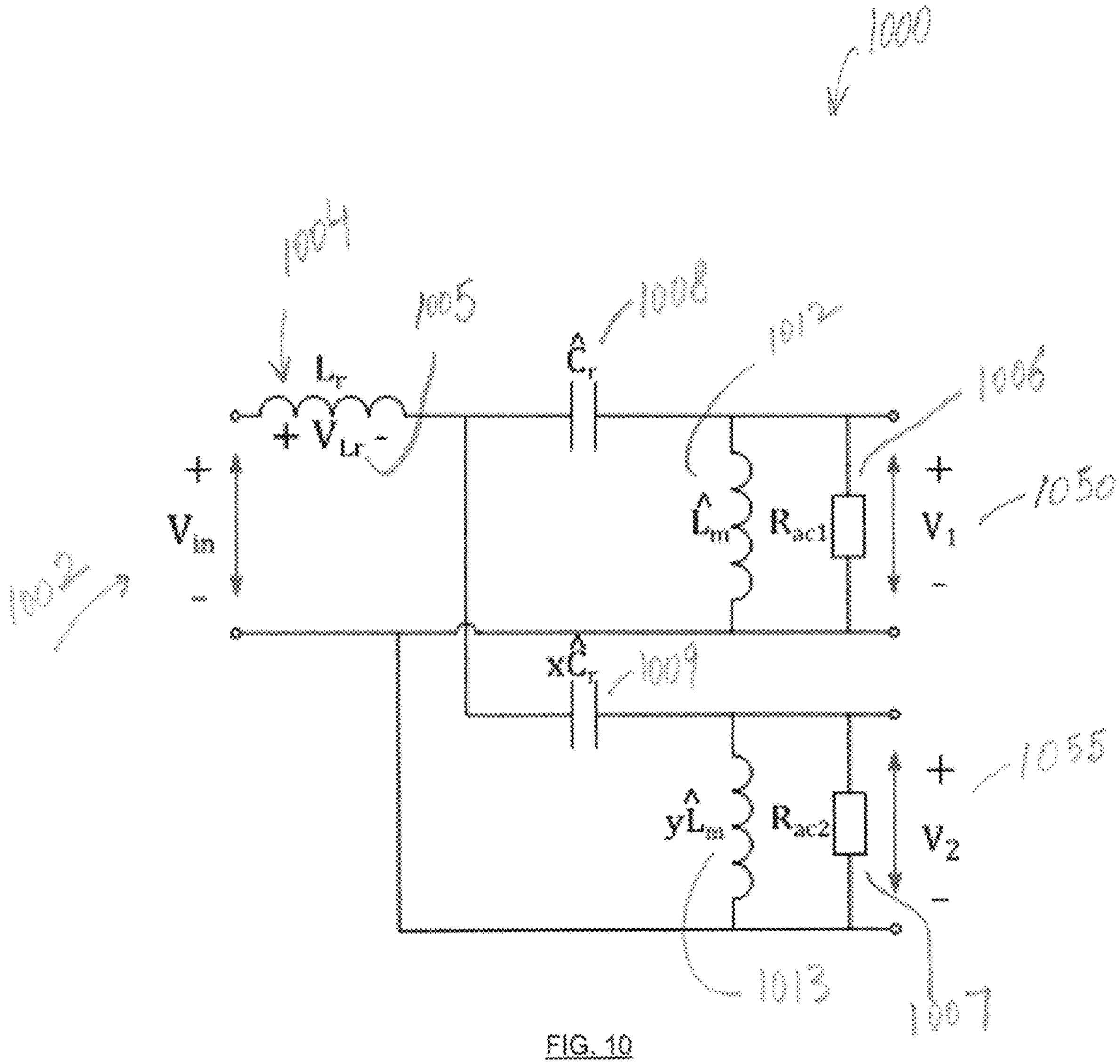
FIG. 10 is a schematic equivalent view of an LLC resonant converter according to an example embodiment.

Reference is next made to FIG. 10, which illustrates a schematic equivalent view 1000 of an LLC resonant converter in the parallel mode. The schematic view 1000 represents an FHA equivalent circuit of the LLC resonant converter.

The parameters $L_r$ 1004 and $V_{Lr}$ 1005 respectively represent the common resonant inductor, and the voltage across it. Parameters C^r 1008 and L^m 1012 represent half the required resonant capacitor and double the required magnetizing inductance, respectively. Parameters xC^r 1009 and yL^m 1013 represent the resonant components in the second parallel branch, where x and y are the tolerances between the two parallel branches.

At steady state, the output load equivalent resistance ($R_o$) is split into a first output load equivalent resistance ($R_{o1}$), and a second output load equivalent resistance ($R_{o2}$) at each output rectifier. The reflected resistances are accordingly split into a first reflected resistance ($R_{ac1}$) 1006, and a second reflected resistance ($R_{ac2}$) 1007, where reflected resistance $R_{ac}$ is determined based on the following equation (8):

$$\begin{cases} R_{o1} = \frac{1}{k}R_o,\ R_{o2} = \frac{1}{1-k}R_0,\ k \in [0, 1] \\ R_{ac} = \frac{8n^2}{\pi^2}R_o,\ R_{ac1} = \frac{8n^2}{\pi^2}R_{o1},\ R_{ac2} = \frac{8n^2}{\pi^2}R_{o2}| \\ R_{ac1} = \frac{1}{k}R_{ac},\ R_{ac2} = \frac{1}{1-k}R_{ac} \end{cases} \tag{8}$$

In equation (8), k represents the load resistance sharing error between the two secondary sub-units. Load resistance sharing error (k) of 0.5 represents the ideal case where the two rectifiers share the current equally. Load resistance sharing errors (k) of 0 or 1 indicates that only one rectifier supplies the load current.

Each of the voltage across the first reflected resistance ($V_1(s)$) 1050 of the first parallel branch, and voltage across the second reflected resistance ($V_2(s)$) 1055 of the second parallel branch is determined based on the following equation (9):

$$\begin{cases} V_1(s) = \dfrac{K_{ac1} / 1SL_m}{R_{ac1} // sL_m + 1/sC_r}(V_{in}(s) + V_{Lr}(s)) \\ V_2(s) = \dfrac{R_{ac2} // scL_m}{R_{ac2} // scL_m + 1/sbC_r}(V_{in}(s) + V_{Lr}(s)) \end{cases} \tag{9}$$

In the parallel mode, the two diode rectifiers are connected in parallel, therefore $V_1(s)$ and $V_2(s)$ are of equal magnitudes, as noted in equation (10):

$$|V_1(s)| = |V_2(s)| \tag{10}$$

From equations (8), (9) and (10), the load resistance sharing error (k) in terms of the system parameters and the tolerances is expressed in equation (11), where ω is the angular frequency:

$$k = \begin{cases} -\dfrac{R_{ac}^2(x^2y^2-1) - \widehat{L_m}^2 y^2\omega^2 + 2\widehat{C_r}\widehat{L_m}R_{ac}^2\omega^2(xy - x^2y^2)}{2\widehat{L_m}^2 y^2\omega^2}, & x = 1 \\ \pm\dfrac{2\sqrt{\begin{array}{l}\widehat{L_m}^4 y^4\omega^4 - \widehat{L_m}^2 y^2\omega^2(x^2-1)(R_{ac}^2(x^2y^2-1) - \\ \widehat{L_m}^2 y^2\omega^2 + 2\widehat{C_r}\widehat{L_m}R_{ac}^2\omega^2(xy - x^2y^2))\end{array}} + 2\widehat{L_m}^2 y^2\omega^2}{2\widehat{L_m}^2 y^2\omega^2(y^2-1)}, & x \neq 1 \end{cases} \tag{11}$$

The current sharing error is determined based on equation (12) below:

$$\varepsilon = \left|\frac{I_1 - I_2}{I_{load}}\right| = |2k - 1| \tag{12}$$

Figure 11:
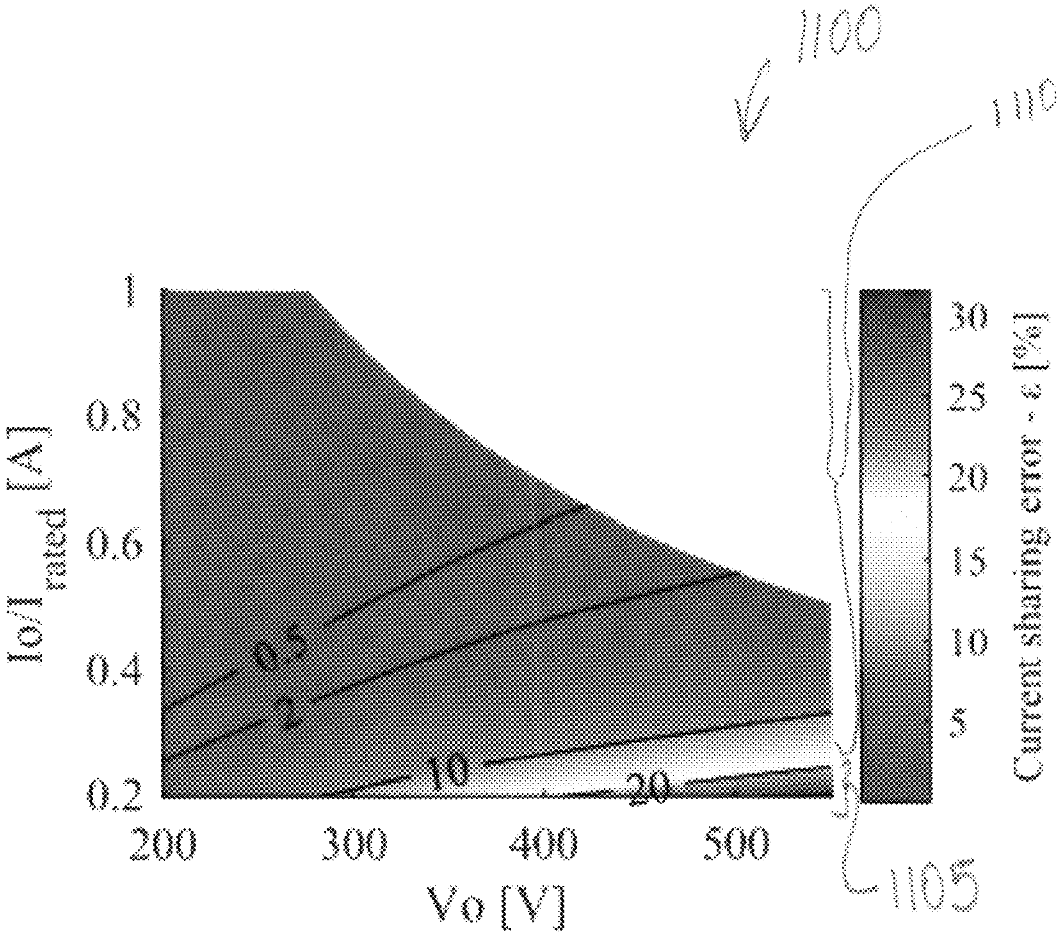
FIG. 11 is a graphical representation of a current sharing error of an LLC resonant converter according to an example embodiment.

Reference is briefly made to FIG. 11, which illustrates a graphical representation 1100 of the output current sharing error between the two secondary sub-units of an LLC resonant converter. In the illustrated embodiment, the current sharing is analyzed over the converter output current range in the parallel mode with approximately 3% parameter error. As shown by reference 1105, the current sharing error (ε) has its peak at low current ratings. The current sharing error then starts decreasing by increasing the load, reaching less than 5% at half the rated load, as shown by reference 1110.

Figure 12:
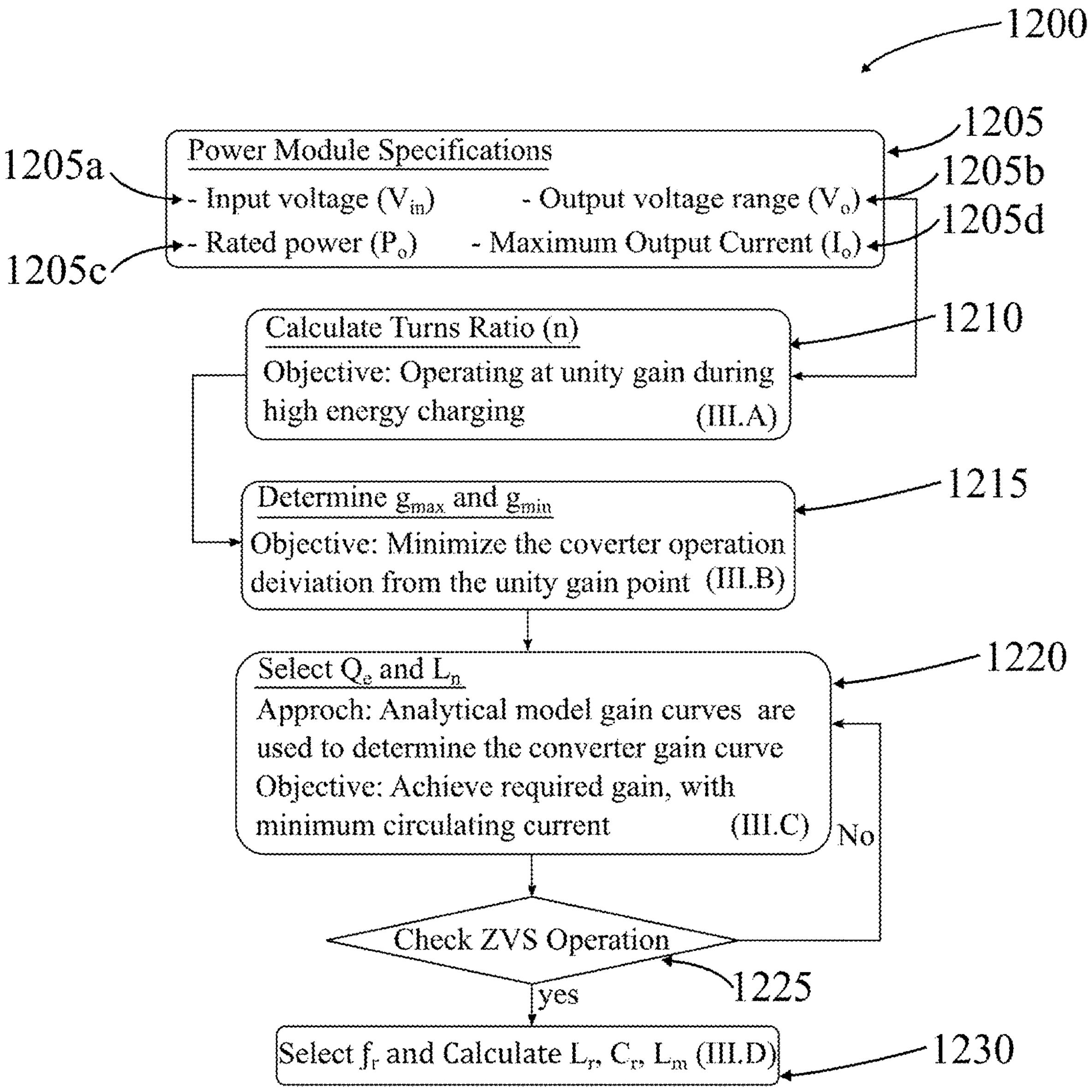
FIG. 12 is a flow diagram depicting a method of determining parameters of an LLC resonant converter according to an example embodiment.

Reference is next made to FIG. 12, which illustrates the methodology 1200 for optimizing the LLC resonant converter disclosed herein. In various embodiments, the methodology 1200 of FIG. 12 is carried out by a controller coupled to various components of an LLC resonant converter, such as the LLC resonant converter of FIGS. 2A-2C.

Methodology 1200 begins at step 1205 where power module specifications 1205 are determined. The power module specifications may include one or more of the parameters such as, for example, input voltage ($V_{in}$) 1205*a*, output voltage range ($V_o$) 1205*b*, rated output power ($P_o$) 1205*c* and maximum output current ($I_o$) 1205*d*.

In some embodiments, the output voltage range 1205*b* is selected first to cover the typical electric car charging profile in addition to higher voltage electric cars, electric buses and electric trucks. In various embodiments, the output voltage range ($V_o$) 1205*b* extends between 200V and 1000V.

Next, the power rating ($P_o$) 1205*c* and the input voltage ($V_{in}$) 1205*a* are selected. In various embodiments, the converter input voltage ($V_{in}$) 1205*a* has a limit of 1500V to comply with the IEC 61851 standard. In various embodiments, the converter input voltage ($V_{in}$) 1205*a* is selected at 800V. This provides the advantage of enabling use of 1200 V SiC devices.

Next, at step 1210, the transformer turns ratio (n) is selected. In various embodiments, the turns ration (n) is selected to set the converter output voltage around the typical electric car battery nominal voltage at the resonant tank unity-gain operation. This allows the converter to operate around the resonance frequency with minimal losses during high power charging of the typical electric vehicles.

Next, at step 1215, the converter's maximum ($g_{max}$) and minimum ($g_{min}$) gains are determined. The maximum and minimum gains are determined to minimize the converter's operation deviation from the unity gain point.

Next, at step 1220, the quality factor ($Q_e$) at the rated load and the inductance ratio ($L_n$) are determined. In various embodiments, converter analytical model is used to determine the quality factor and the inductance ratio. The quality factor and the inductance ratio are selected to achieve the required gain with minimum circulating current.

At step 1225, the zero-voltage switching operation of the LLC resonant converter is checked. If the zero-voltage switching does not result at 1225, then the process proceeds to step 1220 to further optimize the parameters of quality factor and inductance ratio.

Next, once the optimized values for quality factor and inductance ratio are determined that result in zero-voltage switching, the process proceeds to step 1230, where the resonance frequency ($f_r$) is selected, and values for resonant components (i.e. resonant inductor ($L_r$), resonant capacitor ($C_r$), and magnetizing inductance ($L_m$)) are calculated.

LLC resonant converter exhibits high efficiency and low electromagnetic interference (EMI) at frequencies around the resonant frequency. The three resonant components ($L_r$, $C_r$ and $L_m$) are the essential factors to control the gain coverage and the converter performance. These three components can be represented by only two variables: the quality factor ($Q_e$) and the inductance ratio ($L_n$) even at different resonant frequency and different load. The variables quality factor and inductance ratio determine the performance of the converter in regards of voltage gain, components stress and converter efficiency. In various embodiments, unnecessary extension of the voltage coverage region tends to compromise the converter efficiency. Accordingly, the values for optimal turns ratio (n), quality factor ($Q_e$) and inductance ratio ($L_n$) are selected (at steps 1210, 1220) to cover the required voltage range without an unnecessary increase in the circulating current.

Figure 13A:
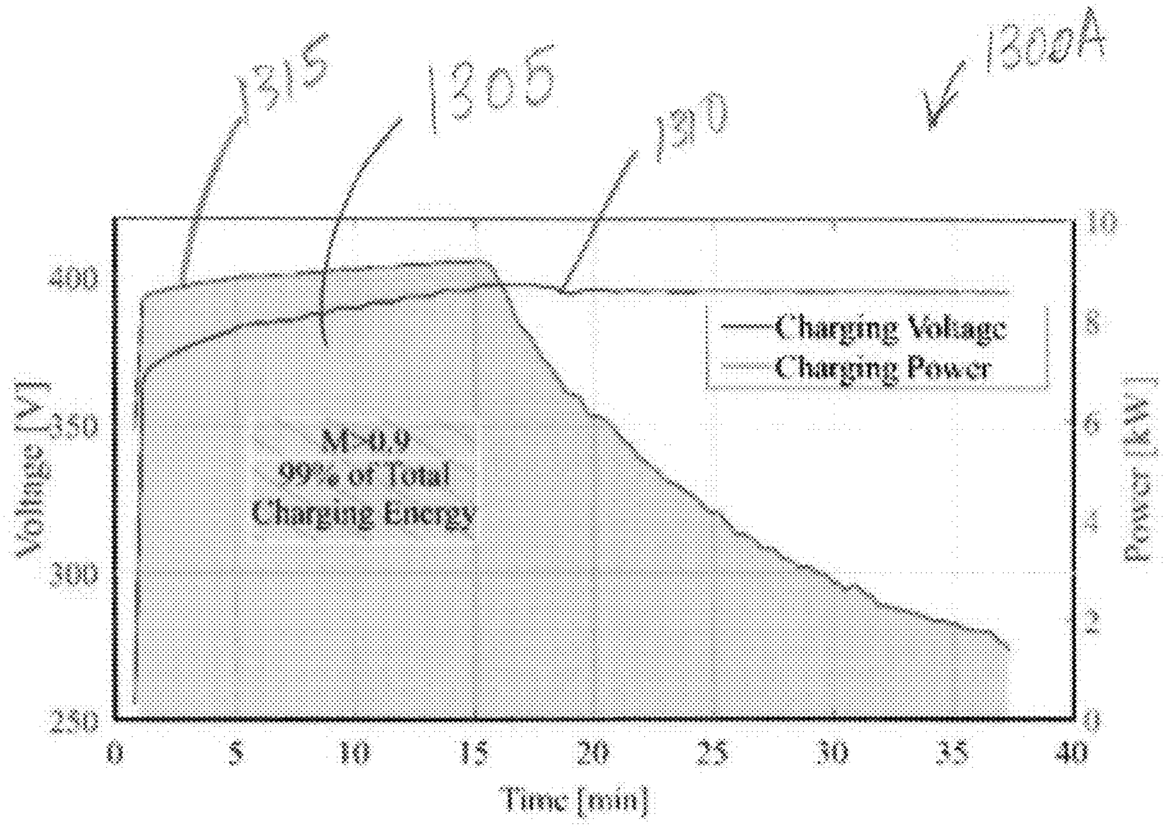
FIG. 13A is a graphical representation of a charging power profile of an electric vehicle according to an example embodiment.
Figure 13B:
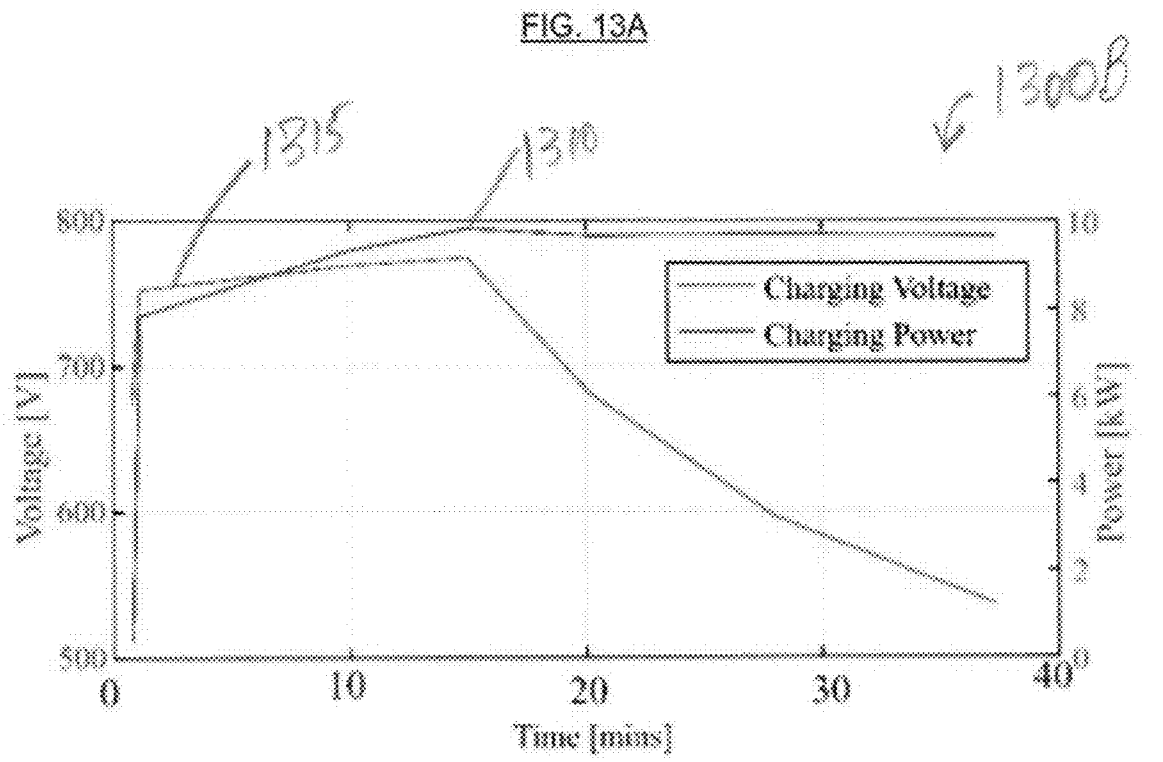
FIG. 13B is a graphical representation of a charging power profile of an electric vehicle according to another example embodiment.

Reference is next made to FIGS. 13A and 13B and interchangeably to FIG. 12 to illustrate how transformer turns ratio (n) is determined at step 1210. FIGS. 13A and 13B respectively illustrate a charging profile 1300A of a typical EV, such as 'Nissan Leaf—400V' (FIG. 13A) and a generic 800V charging profile 1300B (FIG. 13B). In the illustrated embodiment of FIG. 13B, a generic 800V battery charging profile is used by doubling the typical 400V battery charging profile voltage while keeping the same charging power. In FIGS. 13A and 13B, plot 1310 illustrates the charging voltage, and plot 1315 illustrates the charging power.

As shown by region 1305 of FIG. 13A, approximately 99% of the charging energy is delivered to the battery at charging voltage in the vicinity of the battery nominal voltage. To efficiently charge these two systems, i.e. a typical electric car battery system with a nominal voltage of 400V and a typical electric buses and/or truck with a nominal voltage of 800V, the transformer turns ratio (n) is determined to allow the converter to operate around the resonant frequency while charging the battery at its nominal voltage.

A factor (M) that represents the ratio between the instantaneous charging voltage and the battery nominal voltage is accordingly determined based on equation (13):

$$M = \frac{V_{char}(t)}{V_{battery-nominal}} \tag{13}$$

As shown in FIG. 13A, almost all energy delivered to the battery is during M>0.9. Consequently, the charging energy efficiency (ne) is increased by delivering almost all the charging power at the unity gain operation point. The charging energy efficiency is determined based on equation (14), where T is the total charging time:

$$\eta_e = \frac{\int_0^T V_{in} I_{in}}{\int_0^T V_o I_o} \tag{14}$$

In the illustrated embodiment, the turns ratio (n) to charge the standard 400V and 800V batteries while operating near the resonant frequency ($f_r$) is determined according to equation (15) where n is defined as $N_p$:$N_s$ of each transformer $T_{r1}$ and $T_{r2}$, such as transformers $T_{r1}$ 220*a* and $T_{r2}$ 220*b*, where $N_p$ is the primary side number of turns and $N_s$ is the secondary side number of turns:

$$n = \frac{V_{in}}{V_{battery-nominal}} \tag{15}$$

In various embodiments, the turns ratio (n) at step 1210 is determined based on equation (15).

Referring back to FIG. 12, the next step after determining the turns ratio (n) at step 1210 is to determine the gain range of the LLC resonant converter at step 1215. Once the turns ratio is ascertained, the next step is to determine the transition point between the series and the parallel configurations that guarantees minimum resonant tank gain (g) deviation from unity gain in both configurations. The transition point that provides the minimum required gain is determined based on equation (16) below, where $V_{transition}$ is the voltage point at which transition between the series and the parallel configurations occurs:

$$V_{transition} = \frac{2V_{in}}{n+1} \tag{16}$$

The required gain (g) in each configuration is calculated to get the maximum and minimum gains. Since both configurations operate at the same quality factor ($Q_e$), both configurations can achieve the same minimum and maximum gains. The maximum and the minimum gains are determined based on equations (17) and (18), respectively:

$$g_{max} = \max\left\{\frac{nV_{transition}}{V_{in}}, \frac{V_{o-max}}{V_{in}}\right\} \tag{17}$$

-continued $$g_{min} = \min\left\{\frac{V_{transition}}{V_{in}}, \frac{V_{o-min}}{V_{in}}\right\} \tag{18}$$

Reference is again made to FIG. 12 to show that the next step after determining the gain range at step 1215 is to determine the values of quality factor and the inductance ratio at step 1220. In the various embodiments disclosed herein, the LLC resonant converter steady-state analytical model is used to determine the values of the quality factor and the inductance ratio at step 1220. This is discussed further with reference to FIGS. 14A-14C.

Figure 14A:
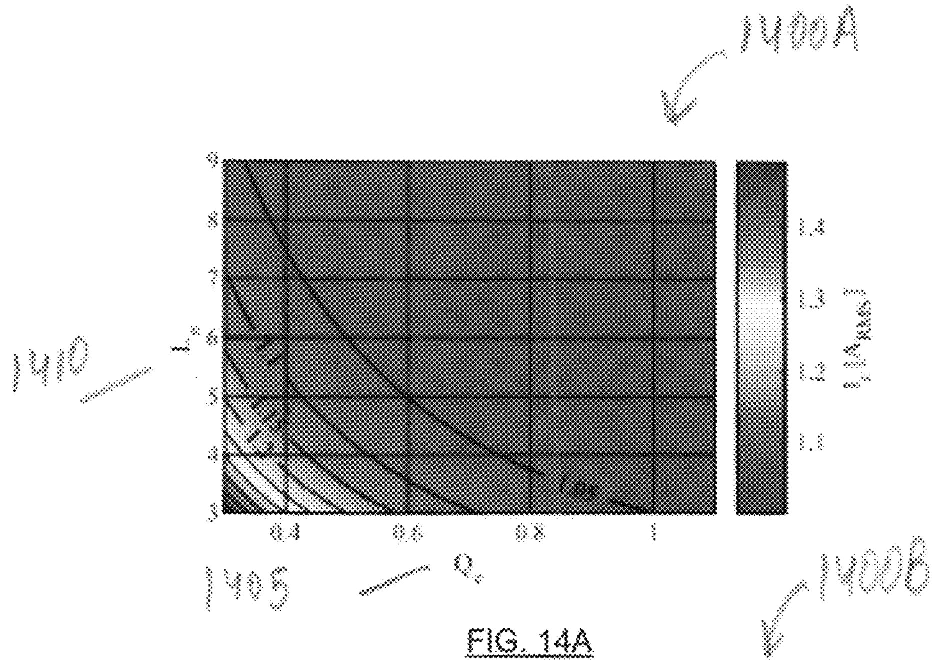
FIG. 14A is a graphical representation of a current profile of an LLC resonant converter according to an example embodiment.
Figure 14B:
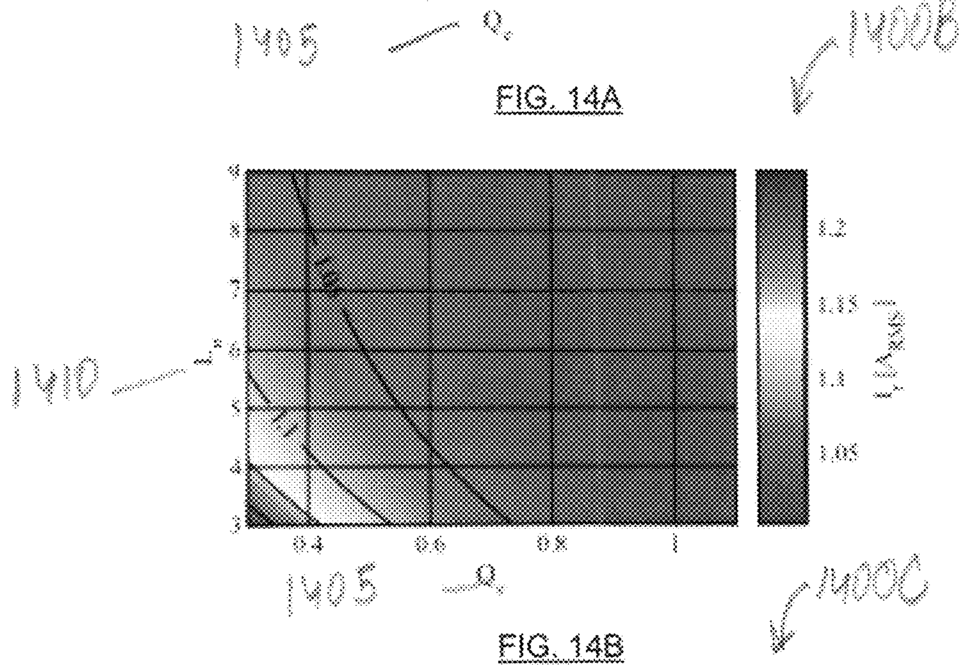
FIG. 14B is a graphical representation of a current profile of an LLC resonant converter according to another example embodiment.
Figure 14C:
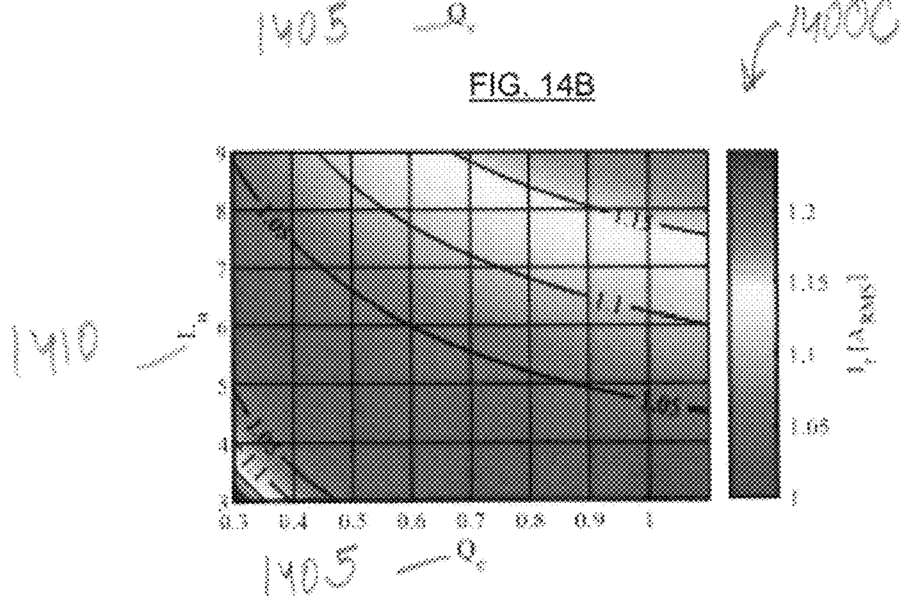
FIG. 14C is a graphical representation of a current profile of an LLC resonant converter according to a further example embodiment.

FIGS. 14A-14C illustrate graphical representations 1400A, 1400B and 1400C of the circulating current profile of the converter plotted against the quality factor on the x-axis 1405, and inductance ratio on the y-axis 1410, at fixed input voltage $V_{in}$, output voltage range $V_o$, rated power $P_o$ and resonant frequency ($f_r$).

Graph 1400A represents the circulating current profile of the converter at gain (g) value of 1. Graph 1400B represents the circulating current profile of the converter at gain (g) value of 0.7. Graph 1400C represents the circulating current profile of the converter at gain (g) value of 1.3.

As seen in graphs 1400A, 1400B and 1400C, by increasing the quality factor and inductance ratio, the circulating current is remarkably increased at the same output power. Moreover, in the boosting operation as shown in FIG. 14C, increasing the quality factor and inductance ratio to a certain point starts increasing the circulating current again. This happens because the converter capability to boost decreases, therefore the switching frequency significantly decreases and the circulating current passing through the magnetizing inductor increases. To reduce the circulating current, the maximum quality factor ($Q_e$) and inductance ratio ($L_n$) that can achieve the required converter gain range have to be selected. Also, the quality factor ($Q_e$) and inductance ratio ($L_n$) cannot be increased to a point where the converter operates at very low switching frequency in boosting mode.

In order to determine the quality factor ($Q_e$) and inductance ratio ($L_n$), two load resistances are defined: a first load resistance ($R_h$) at the highest gain and minimum load, and a second load resistance ($R_l$) at the minimum gain and highest load. The first and second load resistances, $R_h$ and $R_l$, are determined based on the equations (19) and (20), respectively:

$$R_h = \frac{mV_{o-gmax}^2}{P_{o-max}} \tag{19}$$

$$R_l = \frac{mV_{o-gmin}^2}{P_{o-min}} \tag{20}$$

In equations (19) and (20), m is substituted by the turns ratio in series mode and twice the turns ratio in the parallel mode. From equations (5), (19) and (20), and the fact that resonant inductor ($L_r$) and resonant capacitor ($C_r$) are fixed for each design, the ratio between the highest operating quality factor ($Q_{e-min}$) at the minimum required gain, and the lowest operating quality factor ($Q_{e-max}$) at the maximum required gain can be defined in accordance with equation (21) below:

$$\frac{Q_{e-min}}{Q_{e-max}} = \frac{R_h}{R_l} = \zeta \tag{22}$$

The gain requirements are determined based on the quality factor ($Q_e$) and inductance ratio ($L_n$). The converter achieves the maximum gain ($g_{max}$) at the load resistance (Rh,Qe−max) and minimum gain ($g_{min}$) at the load resistance (Rl, Qe−min). In various embodiments disclosed herein, the quality factor ($Q_e$) and inductance ratio ($L_n$) are defined using the maximum gain curves calculated by the LLC analytical model. In this regard, reference is next made to FIG. 15, which illustrates a graphical representation 1500 of a gain profile of an LLC resonant converter.

Figure 15:
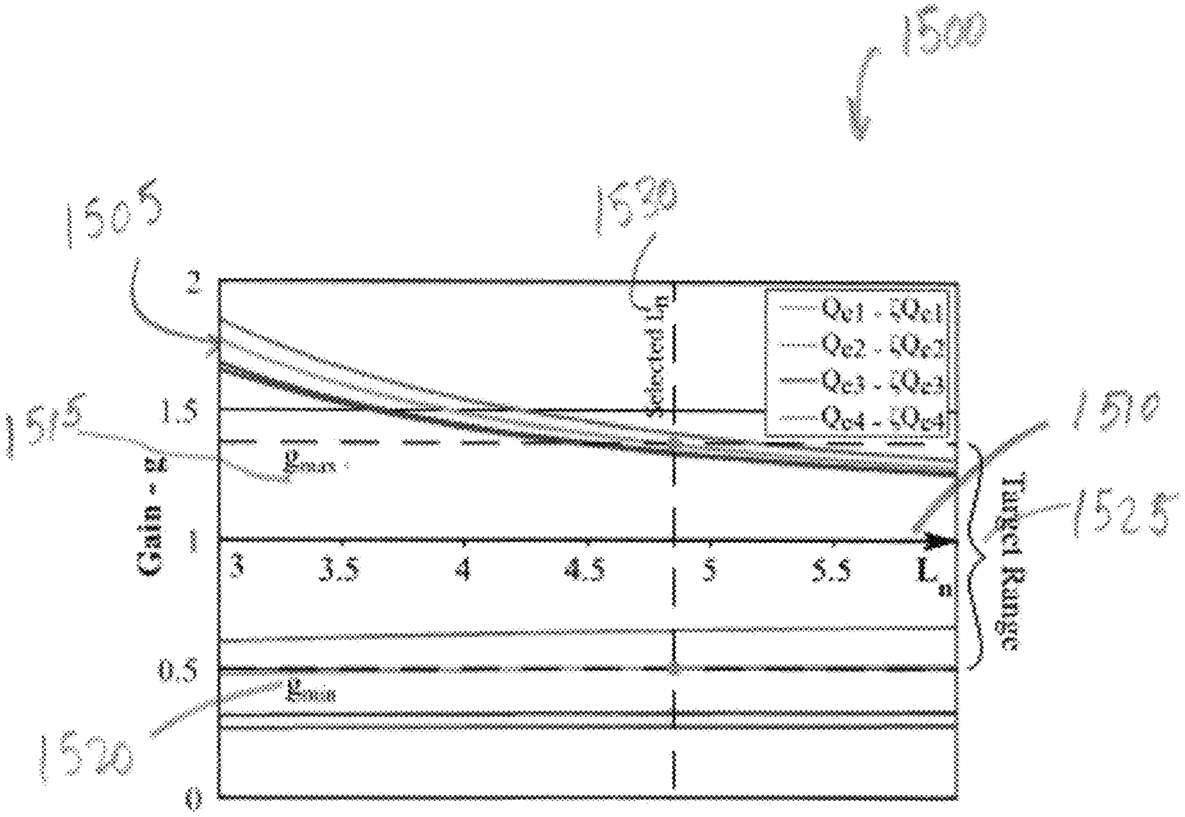
FIG. 15 is a graphical representation of a gain profile of an LLC resonant converter according to an example embodiment.

As shown in FIG. 15, gain profiles of various quality factor values ($Q_e$) 1505 are plotted against inductance ratio values ($L_n$) 1510. The converter's maximum gain ($g_{max}$) 1515 and minimum gain ($g_{min}$) 1520 are also plotted against the converter parameters $Q_e$ 1505 and $L_n$ 1510. The converter's bucking operation is mainly affected by $Q_e$. Hence, $Q_e$ is selected based on the target minimum gain ($g_{min}$). The maximum quality factor ($Q_e$) is selected to reduce the reactive impedance and increase the power factor.

The boosting region of the converter mainly relies on the inductance ratio ($L_n$). Therefore, the maximum inductance ratio ($L_n$) is selected to achieve the maximum gain ($g_{max}$), while avoiding high circulating current. Then, to ensure ZVS operation, the turn-on current at minimum load and minimum gain ($g_{min}$) should fulfill the following constrain represented by equation (22):

$$I_{turnon} \geq \frac{4c_{oss}V_{in}}{t_{dead}} \tag{22}$$

In equation (22), $C_{oss}$ is the switch output capacitance and $t_{dead}$ is the dead time.

Referring back to FIG. 12, the next step 1230 requires that the resonant frequency be determined. In various embodiments illustrated herein, the resonant frequency is determined by compromising between the power density and the switching losses.

In some embodiments, the converter resonant component values are determined based on equation (23):

$$\begin{cases} C_r = \dfrac{1}{2\pi f_r Q_{e-max} R_h} \\ L_r = (Q_{e-max}R_h)^2 . C_r \\ L_m = L_r \cdot L_r \end{cases} \tag{23}$$

Figure 23:
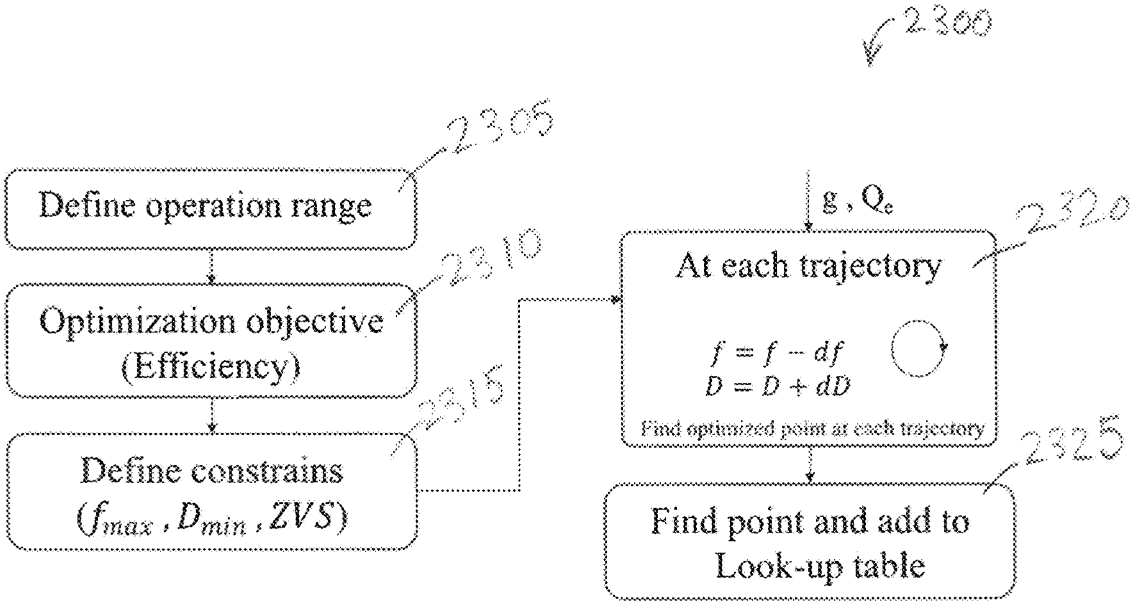
FIG. 23 is a flow diagram depicting a method of determining parameters of an LLC resonant converter according to an example embodiment.

Reference is next made to FIG. 23, which illustrates the methodology 2300 for optimizing the LLC resonant converter disclosed herein. In various embodiments, the methodology 2300 of FIG. 23 is carried out by a controller coupled to various components of an LLC resonant converter, such as the LLC resonant converter of FIGS. 2A-2C.

Methodology 2300 illustrates an improved control technique of the LLC resonant converter of the various embodiments disclosed herein. As discussed with reference to FIG. 22, LLC resonant converters typically controlled using the PFM technique tend to operate at very high switching frequencies at low voltage gain operations. This may result in various disadvantages, such as high electromagnetic interference, high converter losses etc.

In various embodiments, the second control degree of freedom for the LLC resonant converter is a phase shift modulation (PSM). Under phase-shift modulation, the converter frequency ($f_s$) is fixed to the resonant frequency ($f_r$) and the primary-side duty cycle (D) is modulated to control the output voltage. In various cases, this provides the advantage of achieving extremely wide voltage and load gains. However, such control methods may also result in disadvantages, such as, loss in ZVS at low voltage gain operation, resulting in lower operation efficiency.

The proposed control technique requires the control of the LLC resonant converter to be based on two degrees of freedom, i.e. switching frequency ($f_s$) and duty cycle (D). The proposed control technique provides various advantages, such as, for example, high efficiency, lower EMI than embodiments with FM control, wide voltage and load ranges and high-power density. Due to the near to resonant frequency operation of the LLC resonant converter disclosed herein, it can achieve zero-voltage switching and zero-current switching, which results in reduction of switching losses and increase in the efficiency of the converter. In addition, narrower switching frequency range provides the advantage of simplifying the magnetic components design and allows the usage of smaller magnetics leading to a higher power density design.

In the improved control technique disclosed herein, the two degrees of freedom operation (2DoF) is only used in the bucking operation of the LLC resonant converter. For boosting operation, frequency modulation is used as D is fixed to 1 and the switching frequency operate lower than the resonant frequency.

In the bucking operation of the LLC resonant converter, PFM and PSM are used to get maximum frequency ($f_{max}$) and minimum duty cycle ($D_{min}$). Next, the optimized operation switching frequency and duty cycle ($f_{opt}$, $D_{opt}$) are selected using the methodology disclosed in FIG. 23.

Methodology 2300 begins at step 2305 where operation range of the LLC resonant converter is determined. The operation range may consist of desired load range, desired output voltage range, desired charging time, desired power range, other operation based parameters, etc. Next, at step 2310, the optimization objective of the LLC resonant converter is determined. In some embodiments, the optimization objective is defined as increased efficiency of the LLC resonant converter.

At step 2315, various constraints associated with the LLC resonant converter are determined. In various embodiments, the constraints determined at step 2315 include parameters such as, for example, maximum frequency ($f_{max}$), minimum duty cycle ($D_{min}$) and zero-voltage switching.

At step 2320, the optimized operation switching frequency ($f_{opt}$) and optimized operation duty cycle ($D_{opt}$) are determined. In various embodiments, the optimized operation switching frequency and duty cycle are determined based on a time-domain analytical model for an LLC resonant converter. In such embodiments, trajectories for the switching frequency and duty cycle are generated based on the time-domain analytical model and gain and quality factor parameters associated with the LLC resonant converter. For each trajectory, the corresponding optimized point of switching frequency and duty cycle are located.

At step 2325, the optimized switching frequency and duty cycle points ($f_{opt}$, $D_{opt}$) are stored in the controller. In various embodiments, the optimized values are added to a look-up table, which are then added to the converter controller. The controller uses the optimized switching frequency and duty cycle as feedforward control to operate the LLC resonant converter at the optimized points.

Figure 19:
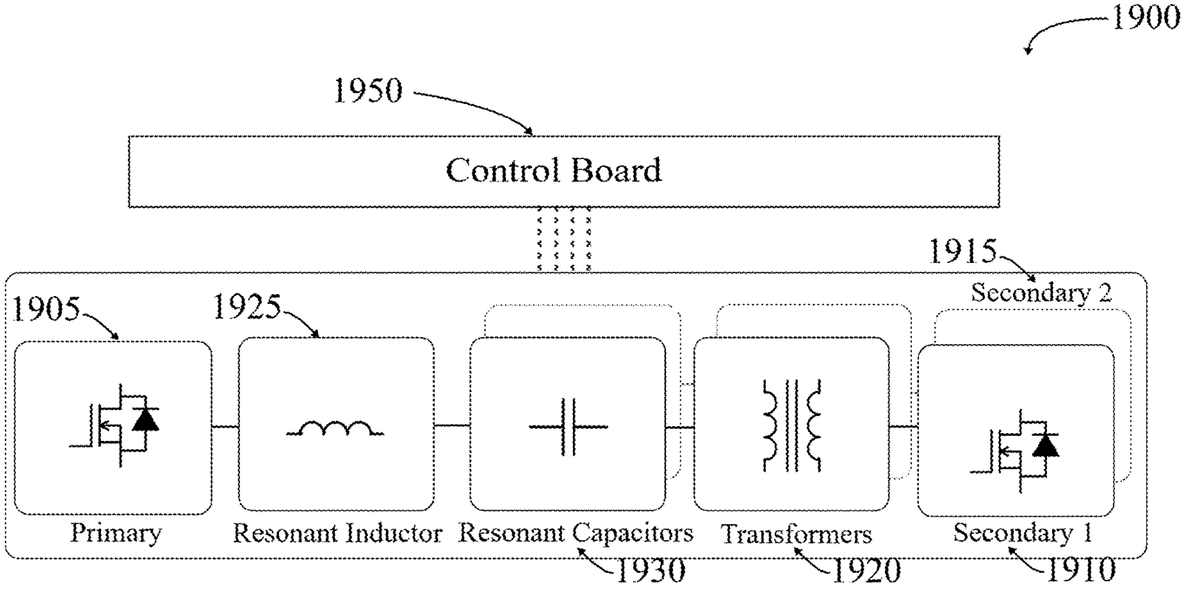
FIG. 19 is a schematic view of an experimental setup of an LLC resonant converter according to an example embodiment.

Reference is next made to FIG. 19, which illustrates an experimental setup 1900 of a prototype of the LLC resonant converter disclosed herein. As shown, the experimental setup 1900 of the LLC resonant converter includes a primary sub-circuit 1905, a first secondary sub-circuit 1910 and a second secondary sub-circuit 1915. The transformer 1920 isolates the primary and the secondary sides. Also shown in the experimental setup are the resonant capacitors 1925 and the resonant inductor 1930. A controller 1950 is also provided to control the operation of the LLC resonant converter. In the embodiment illustrated herein, a controller is used to control the converter and generate the driving signals.

The prototype 1900 is a 10 kW prototype of an LLC resonant converter. The prototype is tested through the entire output voltage range of 200-1000V with a 100V increment. The specification of the prototype is summarized in Table 1 below:

TABLE 1

Module specifications of LLC resonant converter prototype 1900

| Parameters | Value |
|---|---|
| Input Voltage ($V_{in}$) | 800 V |
| Output Voltage ($V_o$) | 200-1000 V |
| $P_o$/Maximum $I_o$ | 10 kW/ 36 A |
| $L_r$/$C_r$/$L_m$ | 42.5 μF/50 nF/200 μF |
| Resonant Frequency ($f_r$) | 120 kHz |
| Switching Frequency ($f_{sw}$) | 80-350 kHz |
| Transformer ratio (n) | 2:1 |
| Primary-side switch | Infineon SiC MOSFET IMZ120R045M1 |
| Secondary-side diode | United SiC Schottky Diode UJ3D1250K2 |

Transformer 1920 of FIG. 19 is designed to have a low leakage inductance and it is measured to be less than 0.7 μH using OMICRON Bode 100 spectrum analyzer. Therefore, the leakage inductance value is neglected compared to the resonant inductor 1930 and not considered in the analysis of the converter.

Reference is made to FIGS. 16A-16C and 17A-17C that show the converter waveforms at the lowest gain operation at output voltage 200V, maximum gain operation at output voltage 533V and maximum voltage point 1000V, and the unity gain operation at output voltages 400V and 800V. In the illustrated embodiment, the results are displayed by a Keysight DSOX2024A oscilloscope, Tektronix 5200A differential probe, and GMW CWT UM/03/B/1/80 current probe.

Figure 16A:
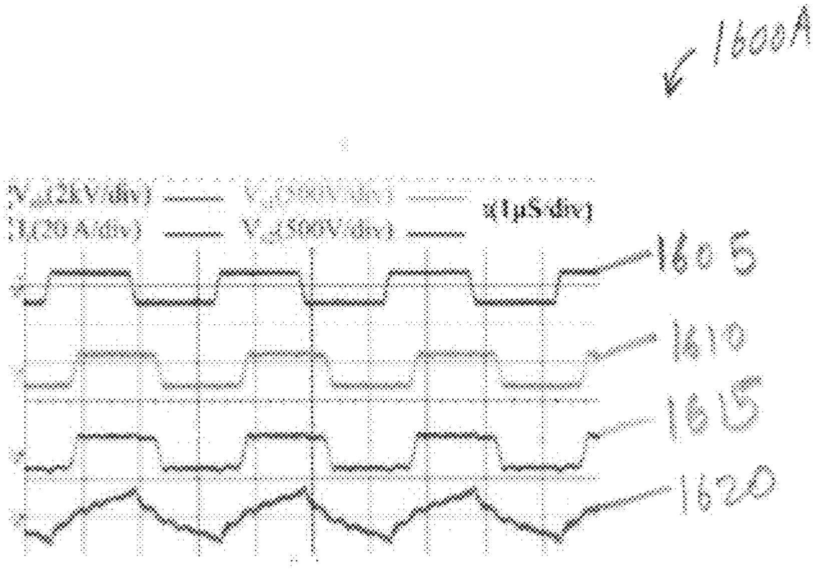
FIG. 16A is a graphical representation of LLC resonant converter parameters according to an example embodiment.
Figure 16B:
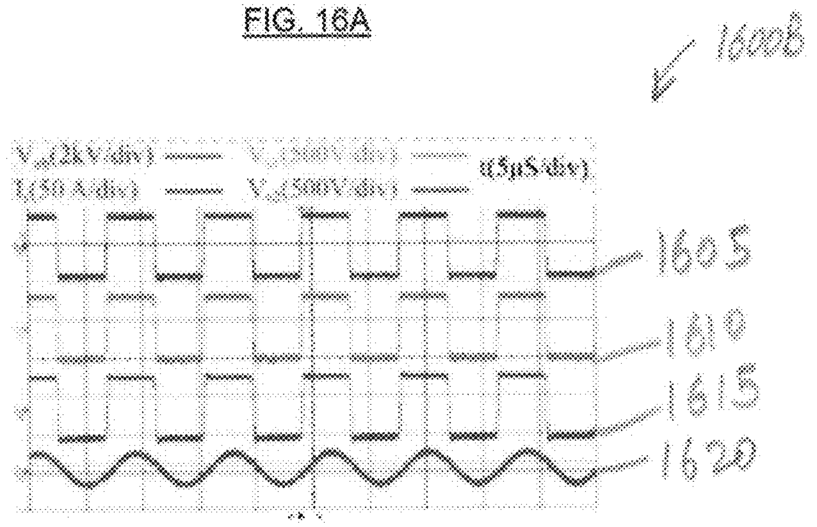
FIG. 16B is a graphical representation of LLC resonant converter parameters according to another example embodiment.
Figure 16C:
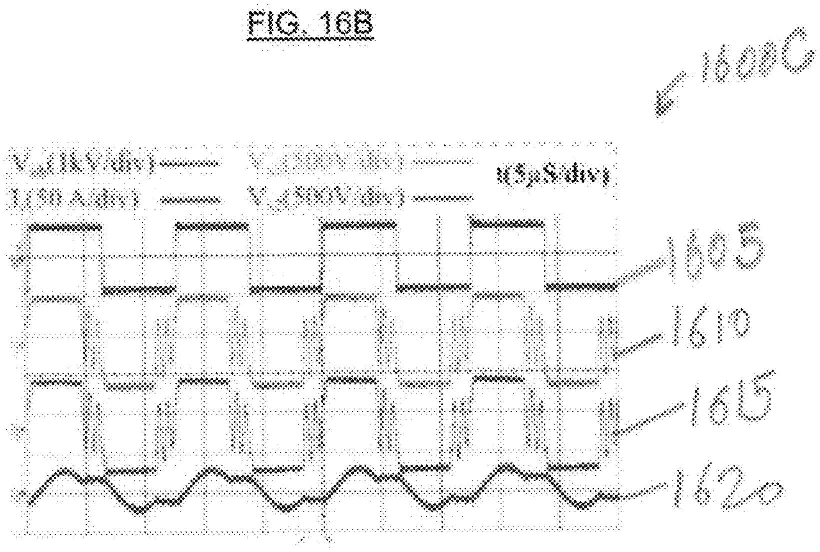
FIG. 16C is a graphical representation of LLC resonant converter parameters according to a further example embodiment.

FIGS. 16A-16C illustrate experimental results for the LLC resonant converter prototype 1900 operating in the parallel mode. FIG. 16A illustrates the graphical representation 1600A of converter's operation at (output voltage, output power) of (200V, 2.5 kW) (i.e. at the lowest gain operation). FIG. 16B illustrates the graphical representation 1600B of converter's operation at (output voltage, output power) of (400V, 10 kW) (i.e. at unity gain operation) and FIG. 16C illustrates the graphical representation 1600C of converter's operation at (output voltage, output power) of (533 V, 10 kW) (i.e. at the maximum gain operation). In the illustrated embodiments, plot 1605 illustrates the primary switch output voltage $V_{ab}$, plot 1610 illustrates the first transformer secondary voltage $V_{s1}$, plot 1615 illustrates the second transformer secondary voltage $V_{s2}$ and plot 1620 illustrates the resonant current $I_r$.

Figure 17A:
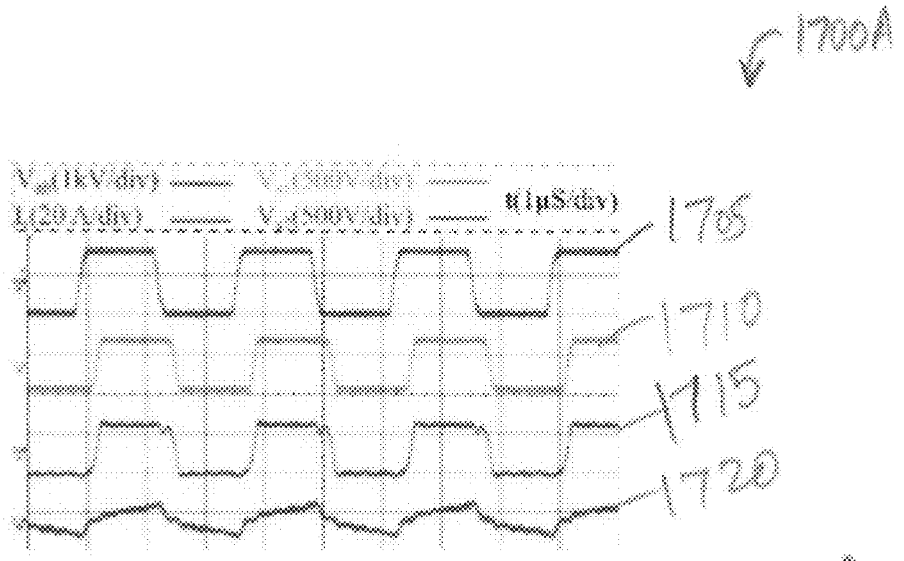
FIG. 17A is a graphical representation of LLC resonant converter parameters according to an example embodiment.
Figure 17B:
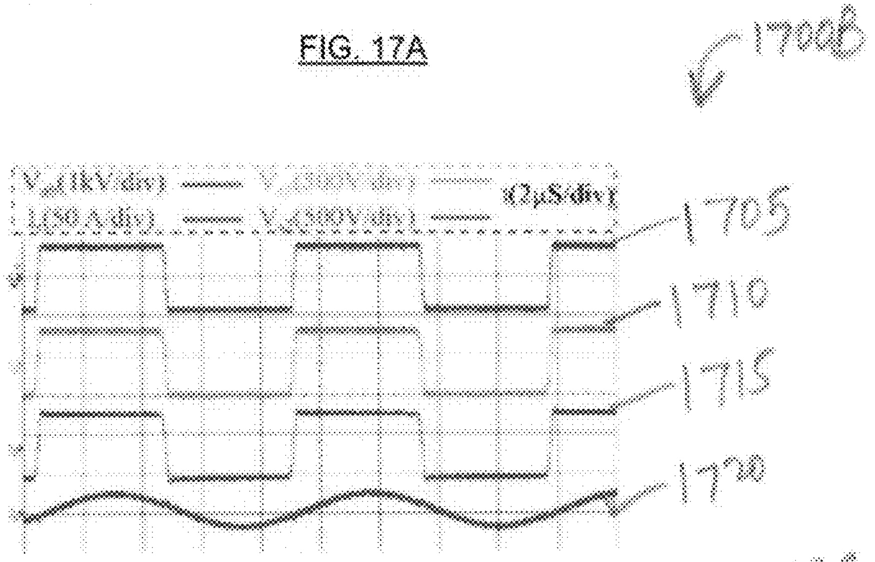
FIG. 17B is a graphical representation of LLC resonant converter parameters according to another example embodiment.
Figure 17C:
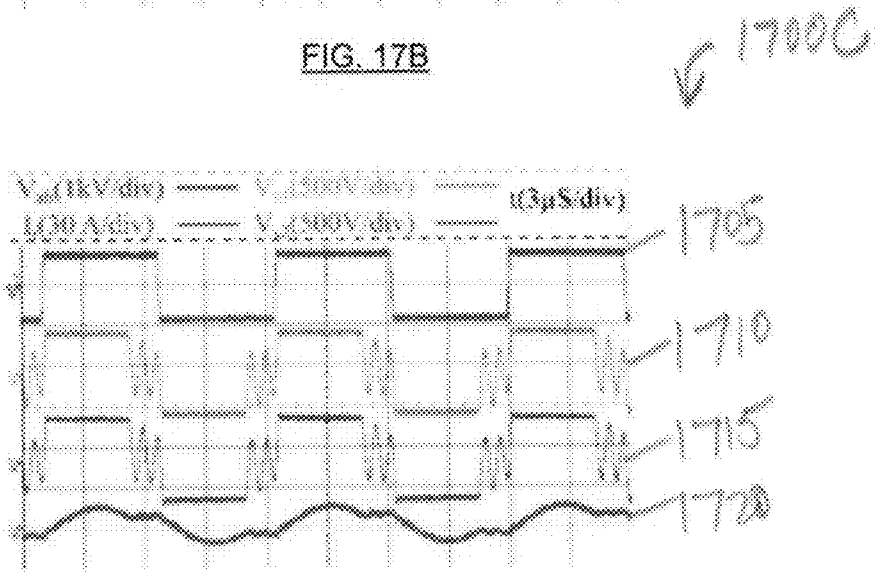
FIG. 17C is a graphical representation of LLC resonant converter parameters according to a further example embodiment.

FIGS. 17A-17C illustrate experimental results for the LLC resonant converter prototype 1900 operating in the series mode. FIG. 17A illustrates the graphical representation 1700A of converter's operation at (output voltage, output power) of (600V, 2.5 kW). FIG. 17B illustrates the graphical representation 1700B of converter's operation at (output voltage, output power) of (800V, 10 kW) (i.e. at the unity gain operation) and FIG. 17C illustrates the graphical representation 1700C of converter's operation at (output voltage, output power) of (1000 V, 10 kW) (i.e. at the maximum voltage point). In the illustrated embodiments, plot 1705 illustrates the primary switch output voltage $V_{ab}$, plot 1710 illustrates the first transformer secondary voltage $V_{s1}$, plot 1715 illustrates the second transformer secondary voltage $V_{s2}$ and plot 1720 illustrates the resonant current $I_r$.

As shown respectively in plots 1610 and 1615 of FIG. 16C as well as plots 1710 and 1715 of FIG. 17C, there are oscillations in the secondary voltages $V_{s1}$ and $V_{s2}$ due to resonance between the circuit inductance and the transformer parasitic interwinding capacitance. This is common in the discontinuous current mode (DCM) in boosting operation.

Figure 20:
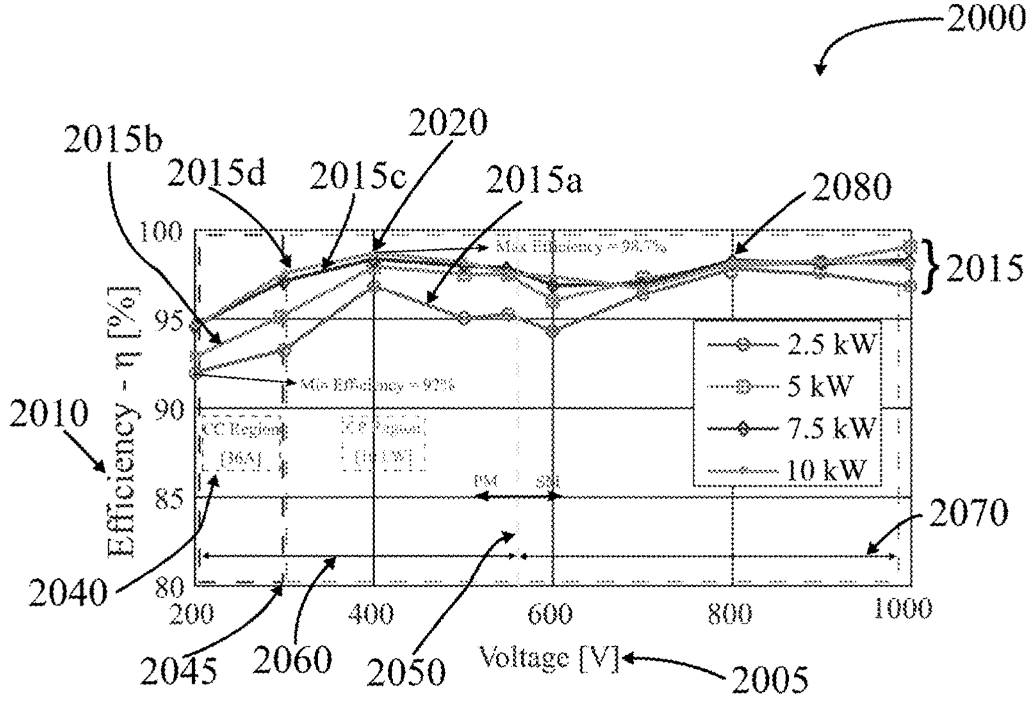
FIG. 20 is a graphical representation of LLC resonant converter efficiency according to an example embodiment.

Reference is next made to FIG. 20, which illustrates a graphical representation 2000 of efficiency map of the LLC resonant converter. The converter of the illustrated embodiment is tested at the constant current (CC) region, shown as region 2040, and the constant power (CP) region, shown as region 2045.

As shown, the x-axis represents the output voltage 2005 and y-axis represents the converter efficiency 2010. Plots 2015 represents the output power ranging from 2.5 kW to 10 kW. Plot 2015*a* represents an output power of 2.5 kW, plot 2015*b* represents an output power of 5 kW, plot 2015*c* represents an output power of 7.5 kW and plot 2015*d* represents an output power of 10 kW.

As shown in FIG. 20, the efficiency increases by increasing the output voltage and output power until reaching maximum efficiency at the first unity gain operation point at 400V. As shown, the converter peak efficiency is around 98.7% at an output voltage of 400V shown using reference number 2020. The converter efficiency then drops to the transition voltage point 2050 due to deviating away from the resonant frequency. At the transition voltage 2050 (533 V), the converter configuration switches to a series mode (region 2070). Prior to that, the converter is operating in a parallel mode (region 2060). As shown, the converter efficiency elevates approaching the second unity gain operation point 2080 at 800V.

Figure 18A:
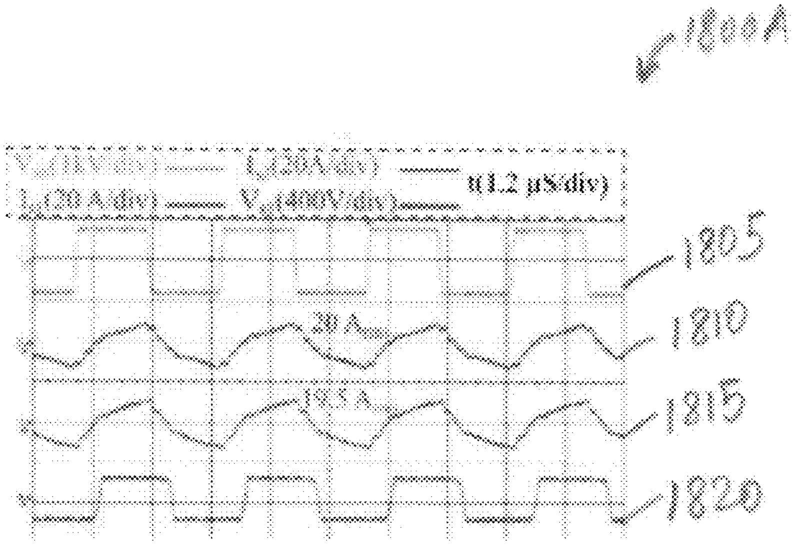
FIG. 18A is a graphical representation of LLC resonant converter parameters according to an example embodiment.
Figure 18B:
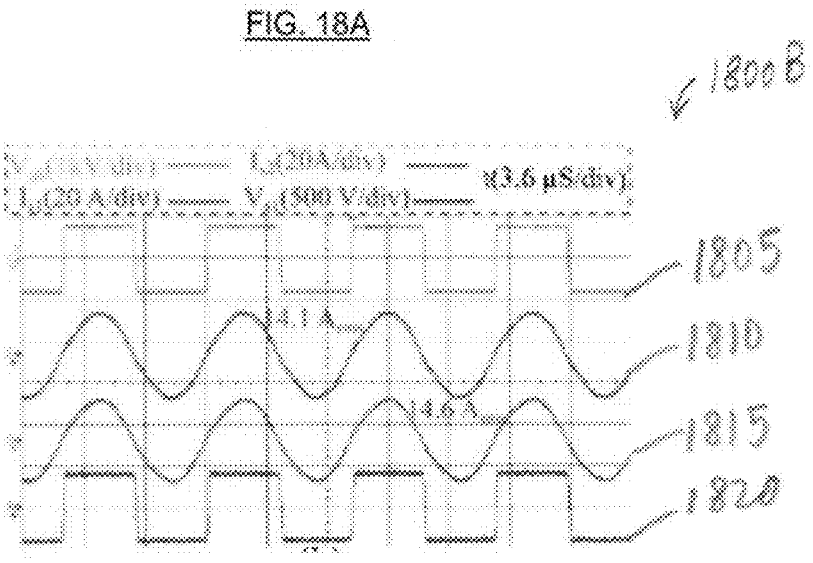
FIG. 18B is a graphical representation of LLC resonant converter parameters according to another example embodiment.
Figure 18C:
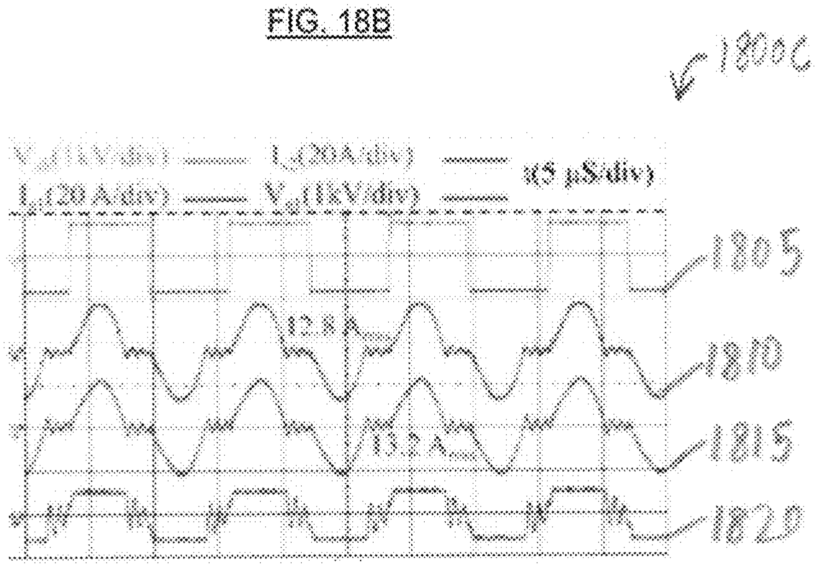
FIG. 18C is a graphical representation of LLC resonant converter parameters according to a further example embodiment.

Reference is next made to FIGS. 18A-18C, which illustrate graphical representation 1800A, 1800B and 1800C of converter parameters operating in a parallel mode at different voltage and power levels. FIG. 18A illustrates a graphical representation 1800A of converter's operation at 200V, 2.5 kW. FIG. 18B illustrates a graphical representation 1800B of converter's operation at 400V, 10 kW. FIG. 18C illustrates a graphical representation 1800C of converter's operation at 533V, 10 kW.

In the illustrated embodiments, plot 1805 illustrates the primary switch output voltage ($V_{ab}$), plot 1810 illustrates the first transformer secondary current ($I_{s1}$), plot 1815 illustrates the second transformer secondary current ($I_{s2}$) and plot 1820 illustrates the first transformer secondary voltage ($V_{s1}$) 1820. As shown in plots 1810 and 1815 of FIGS. 18A-18C, the two transformers secondary currents are identical to each other with similar RMS and low measurement error, validating current sharing.

Figure 21:
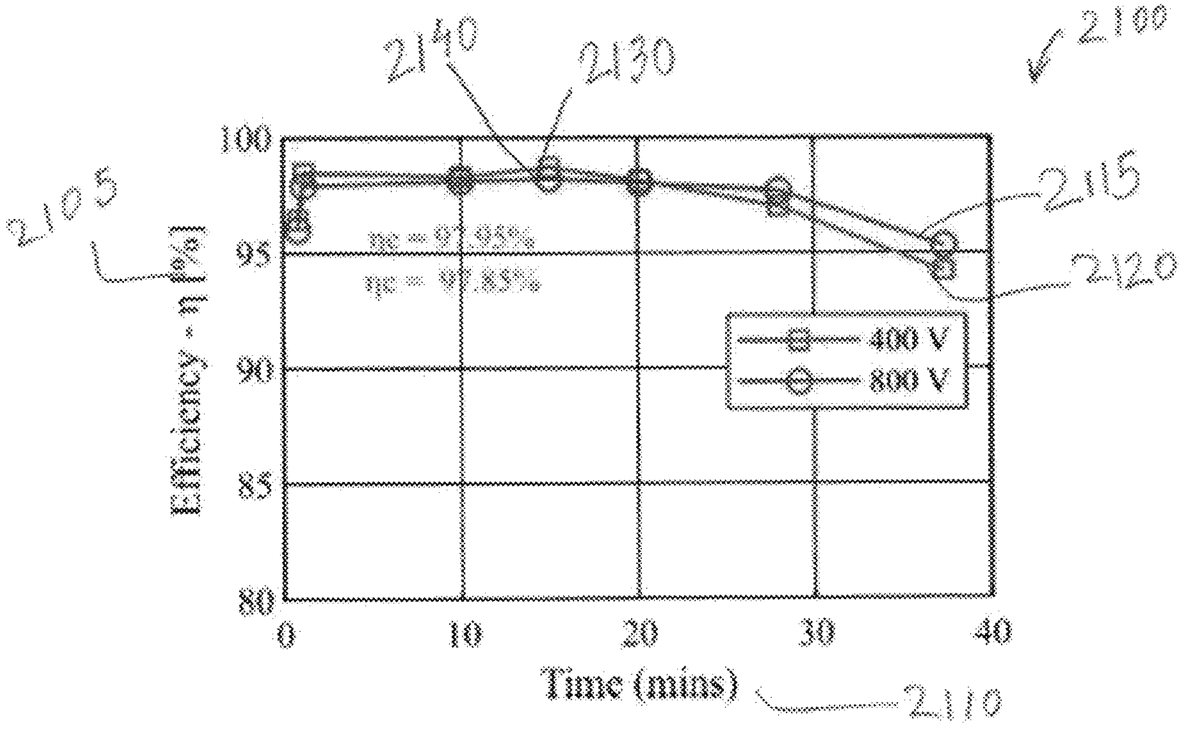
FIG. 21 is a graphical representation of LLC resonant converter efficiency according to another example embodiment.

FIG. 21 is a graphical representation 2100 of efficiency 2105 of LLC resonant converter over time 2110. Plot 2115 illustrates converter performance tested using the charging profile of 400V and plot 2110 illustrates converter performance tested using the charging profile of 800V shown in FIGS. 13A and 13B, respectively.

As shown, the efficiency of the 400V and 800V charging profiles is above 97.8%. The peak efficiency of the 400V charging profile is shown with reference 2130. The peak efficiency of the 800V charging profile is shown with reference 2140. The lowest efficiency is around 94.2% at low power operation at the end of the charging profiles. The converter shows stable and efficient operation over a wide range of output voltage and load.

In the various embodiments disclosed herein, the low power operation efficiency of the LLC resonant converter can be enhanced in a multi-module charger, where two or more LLC resonant converters are coupled with each other. A multi-module charger increasing the efficiency of the charger by controlling the power share between the modules when the modules operate simultaneously.

As discussed in various embodiments herein, the LLC DC/DC charger or resonant converter or charging module has configurable secondary sub-units for EV charging to extend the output voltage range of the converter without operating far from the resonant frequency. Additionally, the LLC resonant converter disclosed herein operates at the same quality factor ($Q_e$) during the parallel and the series mode. This provides the advantage of simplifying the converter design. The converter disclosed herein also achieves the required voltage and power range while minimizing the circulating current on the primary side.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

Items:

Item 1: An LLC resonant converter, comprising: a primary sub-circuit coupled to a direct-current (DC) input voltage; a first secondary sub-circuit and a second secondary sub-circuit; the primary sub-circuit comprising a resonant tank, the resonant tank comprising a combination of a resonant inductor, a resonant capacitor and a magnetizing inductor; a first transformer isolating the primary sub-circuit from the first secondary sub-circuit and comprising a corresponding predetermined number of turns; a second transformer isolating the primary sub-circuit from the second secondary sub-circuit and comprising a corresponding predetermined number of turns; the first and the second secondary sub-circuits being configurable in a series mode and a parallel mode by switching configurations of a plurality of transition switches; and the first and the second secondary sub-circuits providing an output charging voltage and an output charging current for charging an external device.

Item 2: The LLC resonant converter of any preceding item, wherein the primary sub-circuit comprises: a plurality of switches configured in a full-bridge topology; and the resonant inductor connected in series with a parallel combination of a first resonant branch and a second resonant branch, the first resonant branch coupled to the first transformer, and the second resonant branch coupled to the second transformer; the first resonant branch comprising a first resonant capacitor coupled to a first magnetizing inductor, and the second resonant branch comprising a second resonant capacitor coupled to a second magnetizing inductor, wherein each of the first resonant capacitor and the second resonant capacitor provides half the target resonant capacitance, and each of the first magnetizing inductor and the second magnetizing inductor provides twice the target magnetizing inductance.

Item 3: The LLC resonant converter of any preceding item, further comprising a capacitor bank in parallel to the combination of the plurality of switches.

Item 4: The LLC resonant converter of any preceding item, wherein each of the first and second secondary sub-circuits comprises a diode rectifier.

Item 5: The LLC resonant converter of any preceding item, wherein the diode rectifier is a full-bridge rectifier.

Item 6: The LLC resonant converter of any preceding item, wherein each of the first and second secondary sub-circuits comprises a capacitor bank in parallel to the corresponding diode rectifier.

Item 7: The LLC resonant converter of any preceding item, wherein the plurality of transition switches comprise a first transition switch, a second transition switch and a third transition switch.

Item 8: The LLC resonant converter of any preceding item, wherein in the series mode, the first transition switch is closed, and the second and the third transition switches are open, and wherein the first and the second secondary sub-circuits are connected in series and generate a higher output charging voltage than the parallel mode configuration.

Item 9: The LLC resonant converter of any preceding item, wherein in the parallel mode, the first transition switch is open, and the second and the third transition switches are closed, and wherein the first and the second secondary sub-circuits are connected in parallel and generate a lower output charging voltage than the series mode configuration.

Item 10: The LLC resonant converter of any preceding item, wherein the plurality of transition switches are contactors.

Item 11: The LLC resonant converter of any preceding item, wherein the output charging voltage ranges from about 200V to about 1000V.

Item 12: A charging station comprising: at least one charging pole; each charging pole comprising at least one LLC resonant converter module, wherein each LLC resonant converter module comprises: a primary sub-circuit coupled to a direct-current (DC) input voltage; a first secondary sub-circuit and a second secondary sub-circuit; the primary sub-circuit comprising a resonant tank, the resonant tank comprising a combination of a resonant inductor, a resonant capacitor and a magnetizing inductor; a first transformer isolating the primary sub-circuit from the first secondary sub-circuit and comprising a corresponding predetermined number of turns; a second transformer isolating the primary sub-circuit from the second secondary sub-circuit and comprising a corresponding predetermined number of turns; the first and the second secondary sub-circuits being configurable in a series mode and a parallel mode by switching configurations of a plurality of transition switches; and the first and the second secondary sub-circuits providing an output charging voltage and an output charging current for charging an external device; and wherein one or more electric vehicles are charged based on the output charging voltage of one or more LLC resonant converter modules.

Item 13: The charging station of any preceding item, wherein two or more LLC resonant converter modules of each charging pole are arranged in parallel to provide fast charging power to one or more electric vehicles.

Item 14: The charging station of any preceding item, wherein the primary sub-circuit of each LLC resonant converter module further comprises: a plurality of switches configured in a full-bridge topology; and the resonant inductor connected in series with a parallel combination of a first resonant branch and a second resonant branch, the first resonant branch coupled to the first transformer, and the second resonant branch coupled to the second transformer; the first resonant branch comprising a first resonant capacitor coupled to a first magnetizing inductor, and the second resonant branch comprising a second resonant capacitor coupled to a second magnetizing inductor, wherein each of the first resonant capacitor and the second resonant capacitor provides half the target resonant capacitance, and each of the first magnetizing inductor and the second magnetizing inductor provides twice the target magnetizing inductance.

Item 15: The charging station of any preceding item, wherein each of the first and second secondary sub-circuits of each LLC resonant converter module further comprises a diode rectifier.

Item 16: The charging station of any preceding item, wherein the diode rectifier is a full-bridge rectifier.

Item 17: The charging station of any preceding item, wherein the plurality of transition switches of each LLC resonant converter module comprises a first transition switch, a second transition switch and a third transition switch.

Item 18: The charging station of any preceding item, wherein for each LLC resonant converter module, in the series mode, the first transition switch is closed, and the second and the third transition switches are open, and wherein the first and the second secondary sub-circuits are connected in series and generate a higher output charging voltage than the parallel mode configuration.

Item 19: The charging station of any preceding item, wherein for each LLC resonant converter module, in the parallel mode, the first transition switch is open, and the second and the third transition switches are closed, and wherein the first and the second secondary sub-circuits are connected in parallel and generate a lower output charging voltage than the series mode configuration.

Item 20: The charging station of any preceding item, wherein the plurality of transition switches are contactors.

We claim:

1. An LLC resonant converter, comprising:

a primary sub-circuit coupled to a direct-current (DC) input voltage;

a first secondary sub-circuit and a second secondary sub-circuit;

the primary sub-circuit comprising a resonant tank, the resonant tank comprising a combination of a resonant inductor, a resonant capacitor and a magnetizing inductor;

a first transformer isolating the primary sub-circuit from the first secondary sub-circuit and comprising a corresponding predetermined number of turns;

a second transformer isolating the primary sub-circuit from the second secondary sub-circuit and comprising a corresponding predetermined number of turns;

the first and the second secondary sub-circuits being configurable in a series mode and a parallel mode by switching configurations of a plurality of transition switches; and the first and the second secondary sub-circuits providing an output charging voltage and an output charging current for charging an external device, wherein the primary sub-circuit comprises a plurality of switches configured in a full-bridge topology;

wherein the resonant inductor is connected in series with a parallel combination of a first resonant branch and a second resonant branch, the first resonant branch coupled to the first transformer, and the second resonant branch coupled to the second transformer; and wherein the first resonant branch comprises a first resonant capacitor coupled to a first magnetizing inductor, and the second resonant branch comprises a second resonant capacitor coupled to a second magnetizing inductor, wherein each of the first resonant capacitor and the second resonant capacitor provides half a target resonant capacitance, and each of the first magnetizing inductor and the second magnetizing inductor provides twice a target magnetizing inductance.

2. The LLC resonant converter of claim 1, further comprising an input capacitor in parallel to a combination of the plurality of switches comprised in the primary sub-circuit.

3. The LLC resonant converter of claim 1, wherein each of the first and second secondary sub-circuits comprises a diode rectifier.

4. The LLC resonant converter of claim 3, wherein the diode rectifier is a full-bridge rectifier.

5. The LLC resonant converter of claim 3, wherein each of the first and second secondary sub-circuits comprises a corresponding output capacitor in parallel to the corresponding diode rectifier.

6. The LLC resonant converter of claim 1, wherein the plurality of transition switches comprise a first transition switch, a second transition switch and a third transition switch.

7. The LLC resonant converter of claim 6, wherein in the series mode, the first transition switch is closed, and the second and the third transition switches are open, and wherein the first and the second secondary sub-circuits are connected in series and generate a higher output charging voltage than the parallel mode configuration.

8. The LLC resonant converter of claim 6, wherein in the parallel mode, the first transition switch is open, and the second and the third transition switches are closed, and wherein the first and the second secondary sub-circuits are connected in parallel and generate a lower output charging voltage than the series mode configuration.

9. The LLC resonant converter of claim 1, wherein the plurality of transition switches are contactors.

10. The LLC resonant converter of claim 1, wherein the output charging voltage ranges from about 200V to about 1000V.

11. A charging station comprising:

at least one charging pole;

each charging pole comprising at least one LLC resonant converter module, wherein each LLC resonant converter module comprises:

a primary sub-circuit coupled to a direct-current (DC) input voltage;

a first secondary sub-circuit and a second secondary sub-circuit;

the primary sub-circuit comprising a resonant tank, the resonant tank comprising a combination of a resonant inductor, a resonant capacitor and a magnetizing inductor;

a first transformer isolating the primary sub-circuit from the first secondary sub-circuit and comprising a corresponding predetermined number of turns;

a second transformer isolating the primary sub-circuit from the second secondary sub-circuit and comprising a corresponding predetermined number of turns;

the first and the second secondary sub-circuits being configurable in a series mode and a parallel mode by switching configurations of a plurality of transition switches; and the first and the second secondary sub-circuits providing an output charging voltage and an output charging current for charging an external device, wherein the primary sub-circuit of each LLC resonant converter module further comprises:

a plurality of switches configured in a full-bridge topology;

the resonant inductor connected in series with a parallel combination of a first resonant branch and a second resonant branch, the first resonant branch coupled to the first transformer, and the second resonant branch coupled to the second transformer; and the first resonant branch comprising a first resonant capacitor coupled to a first magnetizing inductor, and the second resonant branch comprising a second resonant capacitor coupled to a second magnetizing inductor, wherein each of the first resonant capacitor and the second resonant capacitor provides half a target resonant capacitance, and each of the first magnetizing inductor and the second magnetizing inductor provides twice a target magnetizing inductance; and wherein one or more electric vehicles are charged based on the output charging voltage of one or more LLC resonant converter modules.

12. The charging station of claim 11, wherein two or more LLC resonant converter modules of each charging pole are arranged in parallel to provide fast charging power to one or more electric vehicles.

13. The charging station of claim 11, wherein each of the first and second secondary sub-circuits of each LLC resonant converter module further comprises a diode rectifier.

14. The charging station of claim 13, wherein the diode rectifier is a full-bridge rectifier.

15. The charging station of claim 11, wherein the plurality of transition switches of each LLC resonant converter module comprises a first transition switch, a second transition switch and a third transition switch.

16. The charging station of claim 15, wherein for each LLC resonant converter module, in the series mode, the first transition switch is closed, and the second and the third transition switches are open, and wherein the first and the second secondary sub-circuits are connected in series and generate a higher output charging voltage than the parallel mode configuration.

17. The charging station of claim 15, wherein for each LLC resonant converter module, in the parallel mode, the first transition switch is open, and the second and the third transition switches are closed, and wherein the first and the second secondary sub-circuits are connected in parallel and generate a lower output charging voltage than the series mode configuration.

18. The charging station of claim 15, wherein the plurality of transition switches are contactors.

* * * * *